United States Patent
Ko et al.

(10) Patent No.: US 9,712,298 B2
(45) Date of Patent: Jul. 18, 2017

(54) WIRELESS COMMUNICATION SYSTEM USING DISTRIBUTED ANTENNAS AND METHOD FOR PERFORMING THE SAME

(75) Inventors: Young-Jo Ko, Daejeon (KR); Tae-Gyun Noh, Daejeon (KR); Bang-Won Seo, Daejeon (KR); Jae Young Ahn, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/124,433

(22) PCT Filed: Jun. 7, 2012

(86) PCT No.: PCT/KR2012/004495
§ 371 (c)(1),
(2), (4) Date: Jan. 13, 2014

(87) PCT Pub. No.: WO2012/169799
PCT Pub. Date: Dec. 13, 2012

(65) Prior Publication Data
US 2014/0204853 A1    Jul. 24, 2014

(30) Foreign Application Priority Data

Jun. 7, 2011   (KR) .................. 10-2011-0054572
Jul. 1, 2011   (KR) .................. 10-2011-0065663
(Continued)

(51) Int. Cl.
H04W 72/04    (2009.01)
H04L 5/00     (2006.01)
(Continued)

(52) U.S. Cl.
CPC .......... *H04L 5/0048* (2013.01); *H04L 5/0035* (2013.01); *H04L 5/0057* (2013.01);
(Continued)

(58) Field of Classification Search
CPC ... H04W 28/04; H04W 72/04; H04W 72/042; H04W 88/08; H04L 5/007
(Continued)

(56) References Cited

U.S. PATENT DOCUMENTS 8,478,190 B2 *  7/2013  Sayana et al. ................. 455/7
8,681,727 B2 *  3/2014  Kinnunen ............. H04W 16/12
                                              370/329
(Continued)

FOREIGN PATENT DOCUMENTS

KR   10-2004-0028445 A    4/2004
KR   10-2010-016552 A    12/2010
(Continued)

OTHER PUBLICATIONS

ETRI, 3GPP TSG RAN WG1 Meeting #64 R1-111000 "Discussion on further details of scenario 4" Taipei, Taiwan, Feb. 21-25, 2011 (3 pages, in English).
(Continued)

*Primary Examiner* — Mark Rinehart
*Assistant Examiner* — Sanjay K Dewan
(74) *Attorney, Agent, or Firm* — NSIP Law

(57) ABSTRACT

Provided are a wireless communication system and method using distributed antennas. A physical channel and reference signal (RS) transmission/reception method for downlink and uplink communication using a plurality of points is provided for a case in which the plurality of points have different physical cell identities (PCIs), or in a wireless communication environment using distributed antennas in which the plurality of points belong to the same cell and have the same
(Continued)

| PHYSICAL CHANNEL | LARGE-AREA TRANSMISSION/RECEPTION POINT | SMALL-AREA TRANSMISSION/RECEPTION POINT |
|---|---|---|
| PMCH | TRANSMIT USING SAME RADIO RESOURCES | |
| PBCH | TRANSMIT | NOT TRANSMIT |
| | TRANSMIT USING SAME RADIO RESOURCES | |
| PCFICH | TRANSMIT | NOT TRANSMIT |
| | TRANSMIT USING SAME RADIO RESOURCES | |
| PDCCH | TRANSMIT | NOT TRANSMIT |
| | TRANSMIT USING SAME RADIO RESOURCES | |
| PHICH | TRANSMIT | NOT TRANSMIT |
| | TRANSMIT USING SAME RADIO RESOURCES | |

| (REFERENCE) SIGNAL | LARGE-AREA TRANSMISSION/RECEPTION POINT | SMALL-AREA TRANSMISSION/RECEPTION POINT |
|---|---|---|
| SYNCHRONIZATION SIGNAL AND CRS | TRANSMIT | NOT TRANSMIT |
| | TRANSMIT USING SAME RADIO RESOURCES | |
| CSI-RS | TRANSMIT USING DIFFERENT RADIO RESOURCES | |
| MBSFN RS | TRANSMIT USING SAME RADIO RESOURCES | |
| PRS | TRANSMIT | NOT TRANSMIT |
| | TRANSMIT USING SAME RADIO RESOURCES | |

PCI. Also, a method of transmitting a physical channel and an RS in an uplink and a downlink by introducing a virtual cell identity (VCI) is provided. Further, a cooperative transmission method using a plurality of points is provided, so that communication efficiency of a wireless communication system using distributed antennas can be improved.

15 Claims, 10 Drawing Sheets

(30) Foreign Application Priority Data

| Jul. 28, 2011 | (KR) | ................... | 10-2011-0075024 |
| Aug. 16, 2011 | (KR) | ................... | 10-2011-0081119 |
| Nov. 2, 2011 | (KR) | ................... | 10-2011-0113440 |
| Nov. 4, 2011 | (KR) | ................... | 10-2011-0114781 |
| Mar. 16, 2012 | (KR) | ................... | 10-2012-0027182 |
| Jun. 1, 2012 | (KR) | ................... | 10-2012-0059324 |

(51) Int. Cl.
  *H04W 8/26* (2009.01)
  *H04W 88/08* (2009.01)
  *H04B 7/024* (2017.01)
  *H04B 7/06* (2006.01)
  *H04W 52/14* (2009.01)
  *H04W 52/24* (2009.01)

(52) U.S. Cl.
  CPC ............ *H04L 5/0073* (2013.01); *H04B 7/024* (2013.01); *H04B 7/063* (2013.01); *H04B 7/0632* (2013.01); *H04B 7/0639* (2013.01); *H04W 8/26* (2013.01); *H04W 52/146* (2013.01); *H04W 52/241* (2013.01); *H04W 88/085* (2013.01)

(58) Field of Classification Search
  USPC .................................................. 370/229, 329
  See application file for complete search history.

(56) References Cited

U.S. PATENT DOCUMENTS

| 8,923,203 | B2* | 12/2014 | Fong | .................... | H04J 11/0053 |
| | | | | | 370/252 |
| 2010/0062783 | A1* | 3/2010 | Luo et al. | ...................... | 455/450 |
| 2011/0077038 | A1* | 3/2011 | Montojo | ................. | H04B 7/024 |
| | | | | | 455/507 |
| 2011/0096736 | A1* | 4/2011 | Kwon | ................... | H04W 16/24 |
| | | | | | 370/329 |
| 2012/0176884 | A1* | 7/2012 | Zhang et al. | ................. | 370/203 |
| 2012/0207105 | A1* | 8/2012 | Geirhofer et al. | ............ | 370/329 |
| 2012/0213109 | A1* | 8/2012 | Xu | ......................... | H04B 7/024 |
| | | | | | 370/252 |
| 2012/0329468 | A1* | 12/2012 | Chmiel | ................. | H04L 5/0007 |
| | | | | | 455/450 |
| 2013/0039284 | A1* | 2/2013 | Marinier | ................ | H04L 5/001 |
| | | | | | 370/329 |
| 2013/0107861 | A1* | 5/2013 | Cheng | ................. | H04W 72/042 |
| | | | | | 370/331 |
| 2013/0163569 | A1* | 6/2013 | Lee et al. | ...................... | 370/336 |
| 2013/0260741 | A1* | 10/2013 | Yamada | ................ | H04W 24/00 |
| | | | | | 455/422.1 |
| 2014/0140225 | A1* | 5/2014 | Wala | ............................. | 370/252 |
| 2014/0204853 | A1* | 7/2014 | Ko | ........................ | H04L 5/0073 |
| | | | | | 370/329 |
| 2015/0071196 | A1* | 3/2015 | Park et al. | .................... | 370/329 |

FOREIGN PATENT DOCUMENTS

| KR | 10-2011-0045936 A | 5/2011 |
| WO | WO 2011/041598 A2 | 4/2011 |

OTHER PUBLICATIONS

International Search Report mailed Jan. 2, 2013 in counterpart International Application No. PCT/KR2012/004495 (7 pages, in Korean, with English translation).

\* cited by examiner

FIG. 2

| PHYSICAL CHANNEL | LARGE-AREA TRANSMISSION/RECEPTION POINT | SMALL-AREA TRANSMISSION/RECEPTION POINT |
|---|---|---|
| PMCH | TRANSMIT USING SAME RADIO RESOURCES | |
| PBCH | TRANSMIT | NOT TRANSMIT |
| | TRANSMIT USING SAME RADIO RESOURCES | |
| PCFICH | TRANSMIT | NOT TRANSMIT |
| | TRANSMIT USING SAME RADIO RESOURCES | |
| PDCCH | TRANSMIT | NOT TRANSMIT |
| | TRANSMIT USING SAME RADIO RESOURCES | |
| PHICH | TRANSMIT | NOT TRANSMIT |
| | TRANSMIT USING SAME RADIO RESOURCES | |

| (REFERENCE) SIGNAL | LARGE-AREA TRANSMISSION/RECEPTION POINT | SMALL-AREA TRANSMISSION/RECEPTION POINT |
|---|---|---|
| SYNCHRONIZATION SIGNAL AND CRS | TRANSMIT | NOT TRANSMIT |
| | TRANSMIT USING SAME RADIO RESOURCES | |
| CSI-RS | TRANSMIT USING DIFFERENT RADIO RESOURCES | |
| MBSFN RS | TRANSMIT USING SAME RADIO RESOURCES | |
| PRS | TRANSMIT | NOT TRANSMIT |
| | TRANSMIT USING SAME RADIO RESOURCES | |

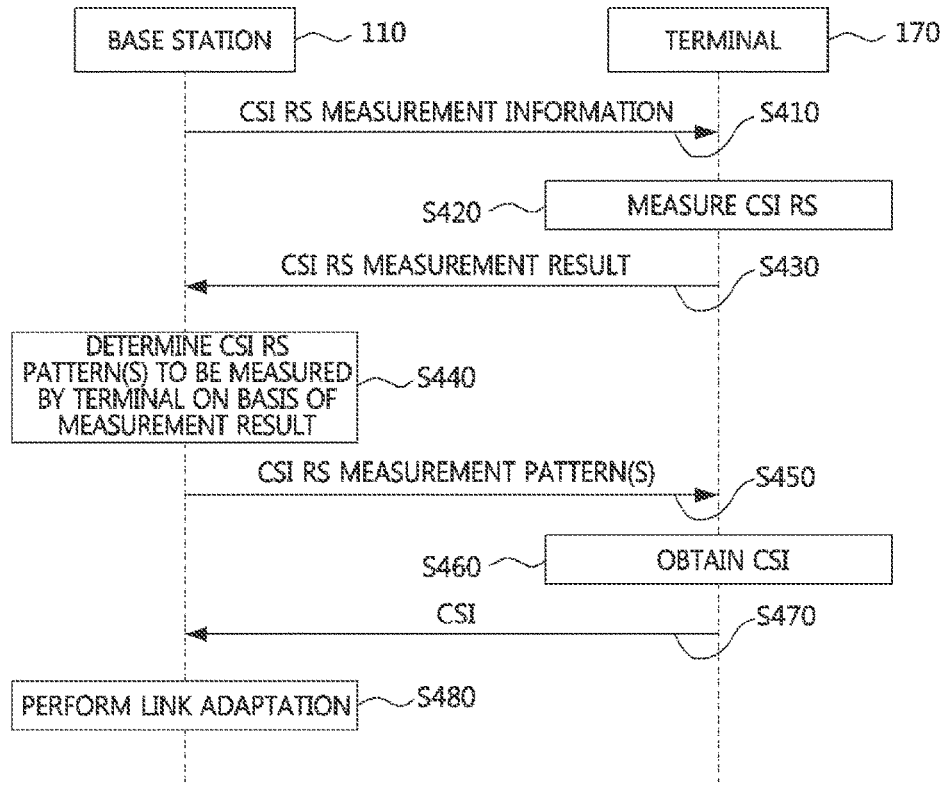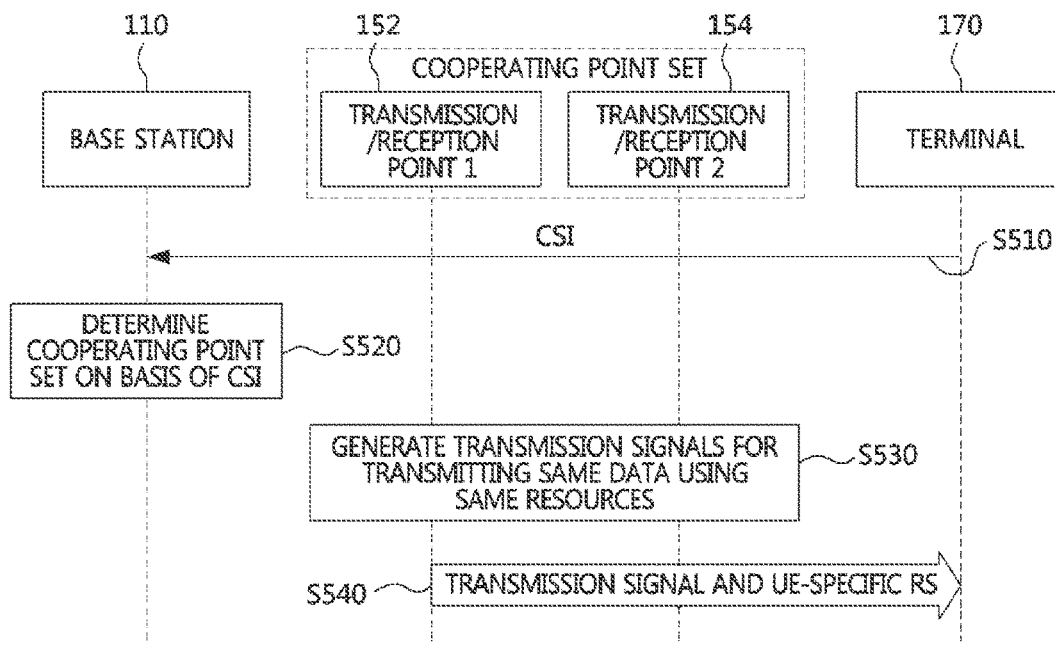

FIG. 6
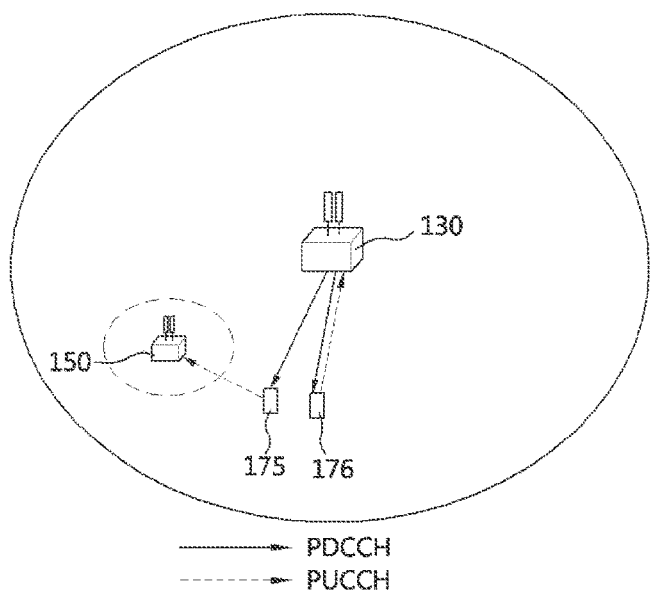
→ PDCCH
--→ PUCCH
FIG. 7
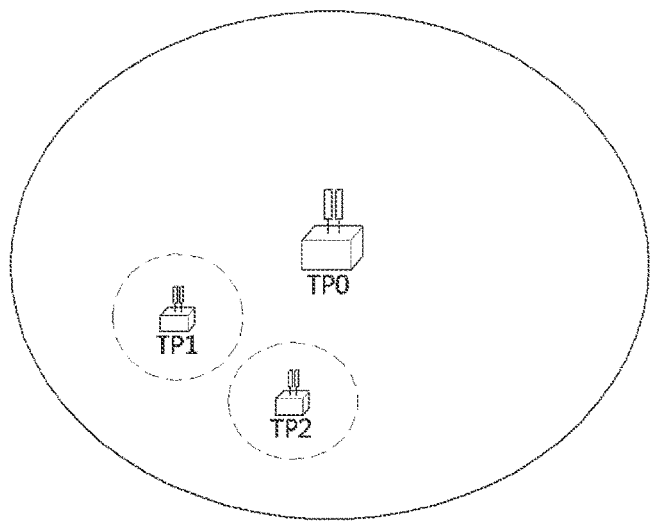
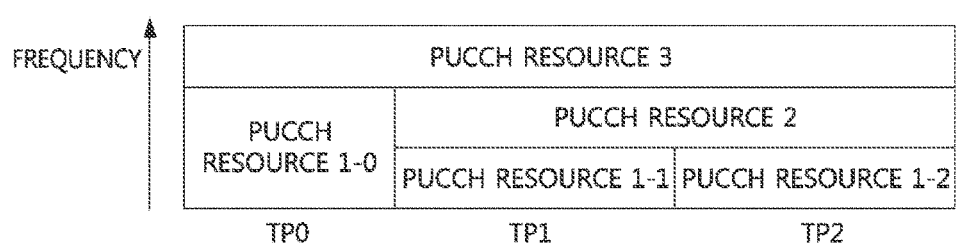

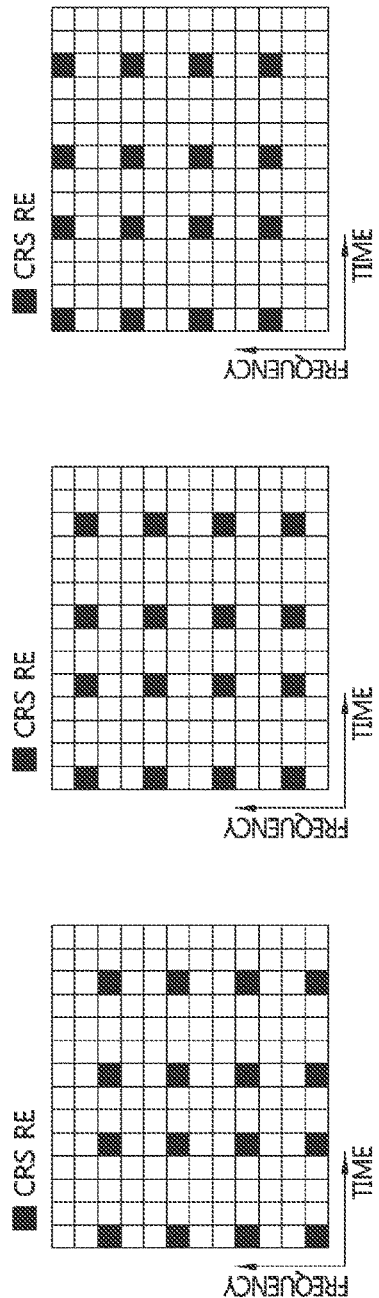
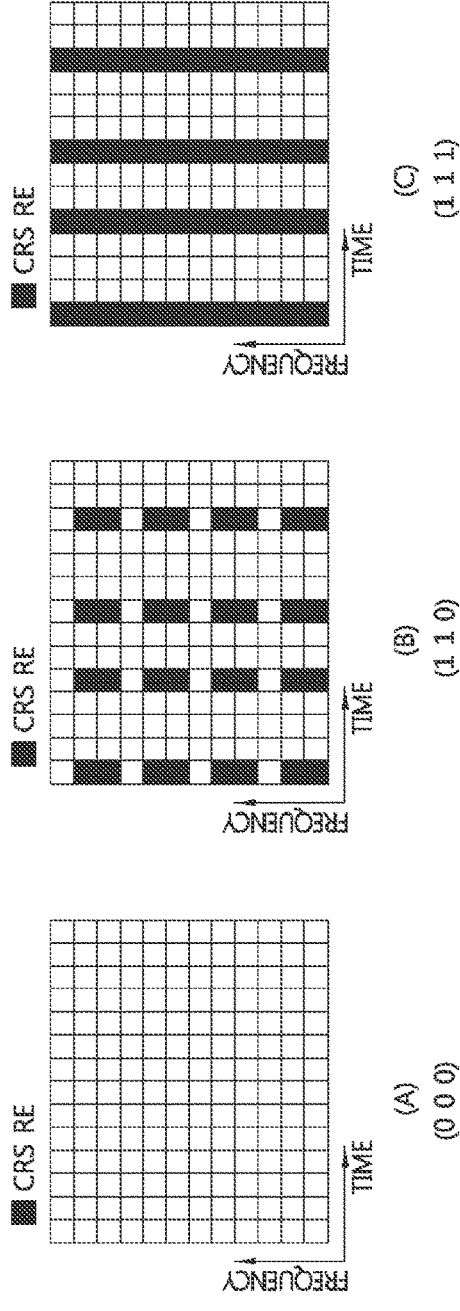

WIRELESS COMMUNICATION SYSTEM USING DISTRIBUTED ANTENNAS AND METHOD FOR PERFORMING THE SAME

CROSS-REFERENCE TO RELATED APPLICATIONS

This application is a National Stage of International Application No. PCT/KR2012/004495, filed Jun. 7, 2012 and published as WO 2012/169799 on Dec. 13, 2012, which claims the benefit of Korean Patent Application Nos. 10-2012-0059324, 10-2012-0027182, 10-2011-0114781, 10-2011-0113440, 10-2011-0081119, 10-2011-0075024, 10-2011-0065663, and 10-2011-0054572, filed on Jun. 1, 2012, Mar. 16, 2012, Nov. 4, 2011, Nov. 2, 2011, Aug. 16, 2011, Jul. 28, 2011, Jul. 1, 2011, and Jun. 7, 2011, the entire disclosures of which are incorporated herein by reference for all purposes.

TECHNICAL FIELD

The present invention relates to a wireless communication system, and more particularly, to a wireless communication system and method that use distributed antennas and can be applied to a wireless communication system having a plurality of transmission points (TPs) geographically spaced apart from each other in a cell.

BACKGROUND ART

Data transmission rates of wireless communication systems are rapidly increasing along with those of wired communication systems. With such a current trend, standardization of a Coordinated MultiPoint (CoMP) transmission/reception method is under way for Third Generation Partnership Project (3GPP) Long Term Evolution (LTE)-Advanced systems, which are fourth generation mobile communication systems.

The CoMP transmission/reception method relates to transmission/reception operations between at least two points (sites, cells, base stations, distributed antennas, etc.) and at least one terminal, and can be divided into uplink CoMP reception and downlink CoMP transmission.

Uplink CoMP reception is a method in which a predetermined terminal transmits a signal to a plurality of points geographically spaced apart from each other, and the plurality of points perform joint-reception of the signal received from the terminal. In uplink CoMP reception, the terminal does not need to know from which network node the signal has been transmitted, or what kind of processing has been performed on the received signal, and only needs to know what kind of downlink signaling is provided in relation to uplink transmission. Thus, uplink CoMP reception can be employed with no significant change in the standard of a wireless interface.

Downlink CoMP transmission is a method in which a plurality of points geographically spaced apart from each other cooperatively transmit a signal to at least one terminal. In 3GPP technical report (TR) 36.814, a downlink CoMP category is divided into joint processing (JP) and coordinated beamforming/coordinated scheduling (CB/CS), and JP is divided again into joint transmission (JT), in which multiple points simultaneously perform physical downlink shared channel (PDSCH) transmission, and dynamic point selection (DPS), in which one point performs PDSCH transmission.

JT uses the concept of distributed antennas in which user data is available at each transmission point (TP) of a CoMP cooperating set. In JT, accurate information on a wireless channel is required, and performance easily varies with delay, estimation error, and so on.

DPS is a method in which one point of a CoMP cooperating set performs PDSCH transmission at a specific moment. In DPS, a TP may dynamically vary, and performance may deteriorate due to feedback delay.

CB/CS is a method in which only a serving point transmits data to a terminal at a certain time. Since CB/CS is a passive method for avoiding interference between TPs, a large capacity increase may not be expected. Also, when user scheduling/beamforming requires information exchange between different base stations for cooperation between TPs corresponding to a CoMP cooperating set, a backhaul may be used for information exchange between the different base stations.

Meanwhile, in the 3GPP LTE Release-8 and Release-9 and LTE-Advanced Release-10 standards, all TPs generally have different physical cell identities (PCIs). Thus, when the aforementioned transmission methods using multiple points are applied to the standards, transmission using multiple points will be performed in an environment in which each TP has its own cell coverage.

For this reason, the existing standards cannot be applied to a multipoint transmission environment in which a plurality of points belong to the same cell and have the same PCI.

DISCLOSURE

Technical Problem

The present invention is directed to providing a wireless communication system and method that uses distributed antennas and enable efficient communication using a plurality of points in a network environment in which the plurality of points belong to the same cell and have the same physical cell identity (PCI), or in a network environment in which the plurality of points have different PCIs.

Technical Solution

One aspect of the present invention provides a wireless communication method using distributed antennas including a base station, a first point and a second point, the method including: assigning, at the base station, virtual cell identities (VCIs) for generating uplink signals of each of at least one terminal to the corresponding terminal; and providing, by the base station, information on the assigned VCIs to the corresponding terminal. Here, assigning, at the base station, the VCIs for generating the uplink signals of each of the at least one terminal to the corresponding terminal may include assigning, at the base station, the same VCI for a downlink and an uplink to the corresponding terminal, or assigning, at the base station, different VCIs for the downlink and the uplink to the corresponding terminal. Here, when the base station assigns the different VCIs for the downlink and the uplink to the corresponding terminal, the base station may separately signal information on VCI for the downlink, and information on VCI for the uplink to the corresponding terminal.

Another aspect of the present invention provides a wireless communication method using distributed antennas, the method including: obtaining, at a terminal, a VCI from a base station; and configuring, at the terminal, a base sequence and cyclic shift hopping (CSH) of a demodulation reference signal (DM RS) for demodulation of an uplink signal using the VCI so as to configure the DM RS.

Still another aspect of the present invention provides a wireless communication method using distributed antennas including a base station, a first point and a second point, the method including: assigning, at the base station, different physical cell identities (PCIs) to respective at least one terminal; and assigning, at the base station, an initialization parameter for generating a pseudo-random sequence to each of the at least one terminal. Here, assigning, at the base station, an initialization parameter for generating a pseudo-random sequence to each of the at least one terminal may include mapping, at the base station, the same initialization parameter for a downlink and an uplink according to a channel state information reference signal (CSI-RS) pattern configured for each of the at least one terminal, or mapping, at the base station, different initialization parameters for the downlink and the uplink to each of the at least one terminal.

Yet another aspect of the present invention provides a wireless communication method using distributed antennas including a base station and at least one point, the method including: assigning, at the base station, different PCIs to respective at least one terminal; and separately configuring, at the base station, information for generating an uplink DM RS of the respective at least one terminal for the corresponding terminal. Here, separately configuring, at the base station, the information for generating the uplink DM RS of the respective at least one terminal for the corresponding terminal may include (a) configuring, at the base station, terminal-specific base sequence indices (BSIs) to be identical and terminal-specific sequence group hopping information to be identical, (b) configuring, at the base station, the terminal-specific BSIs to be different and the terminal-specific sequence group hopping information to be identical, or (c) configuring, at the base station, the terminal-specific BSIs to be identical, and the terminal-specific sequence group hopping information to be different.

Yet another aspect of the present invention provides a wireless communication method using distributed antennas including a base station and a plurality of points, the method including: assigning, at the base station, a VCI for initialization of a DM RS used for demodulation of a downlink signal to a terminal; and providing, at the base station, information on the assigned VCI to the terminal.

Yet another aspect of the present invention provides a wireless communication method using distributed antennas, the method including: obtaining, at a terminal, a sequence of a downlink signal DM RS by applying a VCI assigned by a base station instead of a PCI; and demodulating, at the terminal, a downlink signal on the basis of the obtained sequence of the DM RS.

Yet another aspect of the present invention provides a wireless communication method using distributed antennas including a base station, a first point and a second point, the method including: setting, at the first point and the second point, the same cell-specific reference signal (CRS) energy per resource element (EPRE) and transmitting CRSs to a terminal; and signaling, at the base station, the CRS EPRE value to the terminal.

Yet another aspect of the present invention provides a wireless communication method using distributed antennas including: receiving, at a terminal, information on CRS EPRE set to be identical by a plurality of points from a base station; estimating, at the terminal, downlink pathloss on the basis of the CRS EPRE information; and obtaining, at the terminal, uplink pathloss on the basis of the downlink pathloss.

Yet another aspect of the present invention provides a wireless communication method using distributed antennas including a base station and a plurality of points, the method including: transmitting, at the base station, at least one of CRS EPRE, CSI RS EPRE for each of at least one CSI RS pattern, a ratio of physical downlink shared channel (PDSCH) EPRE to the CRS EPRE, and a PDSCH EPRE to CSI RS EPRE ratio for each CSI RS pattern, or at least one of the CRS EPRE, an EPRE to CRS EPRE ratio of a CRS-based PDSCH, CSI RS EPRE for each of the at least one CSI RS pattern, and a ratio of EPRE of a CSI RS-based PDSCH to EPRE of CSI for each of the at least one CSI RS pattern.

Yet another aspect of the present invention provides a wireless communication method using distributed antennas including a base station and a plurality of points, the method including: obtaining, at a terminal, downlink pathloss on the basis of an RS pattern provided by the base station when a point transmitting a downlink signal is the same as a point receiving an uplink signal transmitted by the terminal, and obtaining, at the terminal, downlink pathloss on the basis of an RS pattern provided by the base station and energy information on resources constituting the RS pattern when the point transmitting the downlink signal is different from the point receiving the uplink signal transmitted by the terminal; obtaining, at the terminal, uplink pathloss on the basis of the obtained downlink pathloss; and performing uplink power control on the basis of the obtained uplink pathloss.

Yet another aspect of the present invention provides a wireless communication method using distributed antennas including a base station and a plurality of points, the method including: when a point communicating through a control channel with a terminal and a point communicating through a data channel with the terminal are different from each other, providing, at the base station, system information including cell ID information on the point communicating through the data channel to the terminal. Here, when a point communicating through an uplink data channel with the terminal and a point communicating through a downlink data channel with the terminal are different from each other, the base station may provide system information including cell ID information on the point exchanging the uplink data channel with the terminal, and the point exchanging the downlink data channel with the terminal to the terminal.

Yet another aspect of the present invention provides a wireless communication method using distributed antennas including a base station and a plurality of points, the method including: signaling, at the base station, information for detecting CRSs respectively configured for a plurality of points receiving an uplink signal transmitted by a terminal and energy information on resources constituting CRS patterns to the terminal, or signaling, at the base station, information for detecting CSI RSs respectively configured for the plurality of points receiving the uplink signal and energy information constituting CSI RS patterns to the terminal.

Yet another aspect of the present invention provides a wireless communication method using distributed antennas including a plurality of points, the method including: configuring, at each point participating in cooperative transmission, any one of a subframe not including a CRS and a subframe of an anchor cell as a reference subframe; and generating, at the point, a downlink data channel on the basis of the configured reference subframe.

Yet another aspect of the present invention provides a wireless communication method using distributed antennas including a base station and a plurality of points, the method including: configuring, at the base station, a plurality of resource mapping patterns for a downlink data channel; and providing, at the base station, information indicating any one of the plurality of resource mapping patterns to a terminal.

Yet another aspect of the present invention provides a wireless communication method using distributed antennas including a base station and a plurality of points, the method including: configuring, at the base station, a plurality of basic muting/CRS patterns for a downlink data channel; and providing, at the base station, information indicating any one of the plurality of basic muting/CRS patterns or a combination of the basic muting/CRS patterns to a terminal.

Advantageous Effects

The above-described wireless communication system and method using distributed antennas provide a physical channel and reference signal (RS) transmission/reception method for downlink and uplink communication using a plurality of points when the plurality of points have different physical cell identities (PCIs), or in a communication environment in which the plurality of points belong to the same cell and have the same PCI.

Also, a method of transmitting a physical channel and an RS in an uplink and a downlink by introducing a virtual cell identity (VCI) is provided, thereby enabling efficient transmission using a plurality of points while minimizing changes in existing standards.

Further, a cooperative transmission method using a plurality of points belonging to the same cell is provided, thereby improving communication efficiency of a wireless communication system using distributed antennas.

DESCRIPTION OF DRAWINGS

FIG. 2 illustrates a downlink communication method of a wireless communication system using distributed antennas according to an exemplary embodiment of the present invention.

FIG. 4 is a flowchart illustrating a channel state information reference signal (CSI-RS)-based measurement process in a downlink communication method using distributed antennas according to an exemplary embodiment of the present invention.

FIG. 5 is a flowchart illustrating a process of performing coordinated multipoint (CoMP) transmission in a downlink communication method using distributed antennas according to an exemplary embodiment of the present invention.

FIG. 6 is a conceptual diagram illustrating a need to improve a physical uplink control channel (PUCCH) in a wireless communication system using distributed antennas.

FIG. 7 is a conceptual diagram of a PUCCH resource allocation method applied to a wireless communication system using distributed antennas according to an exemplary embodiment of the present invention.

FIG. 14 is a conceptual diagram of basic muting/CRS patterns according to exemplary embodiments of the present invention.

FIG. 15 is a conceptual diagram of muting/CRS patterns depending on a control field value according to exemplary embodiments of the present invention.

DESCRIPTION OF MAJOR SYMBOLS IN THE ABOVE FIGURES

Figure 1:
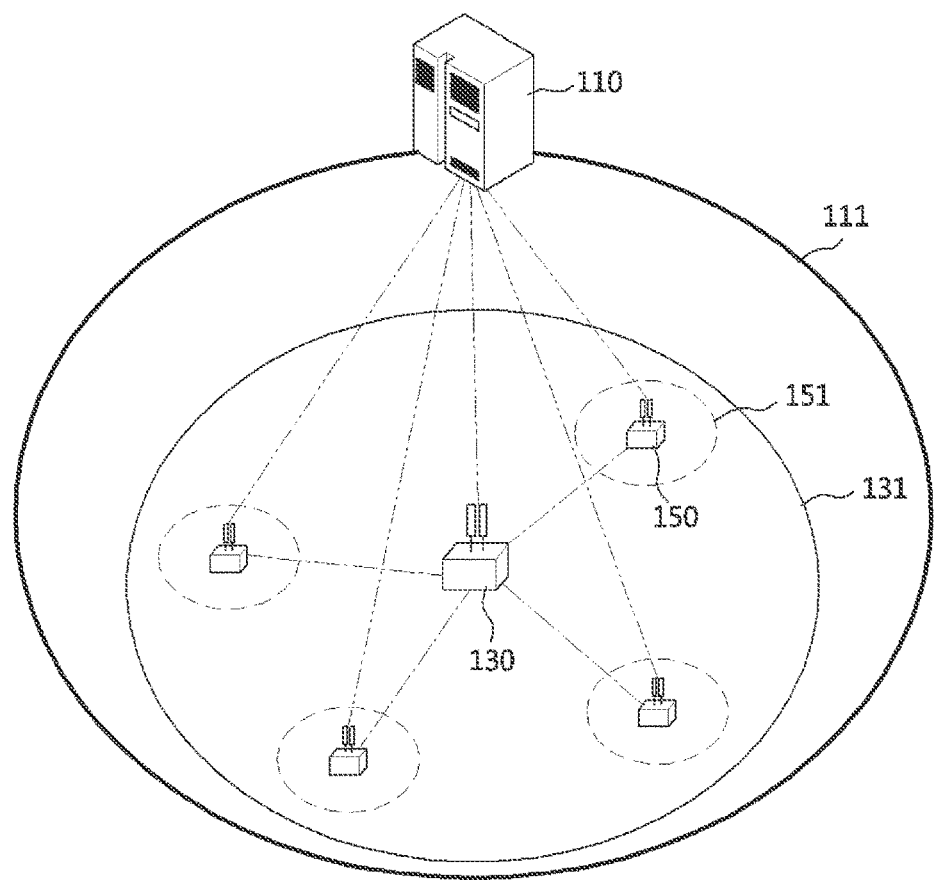
FIG. 1 is a conceptual diagram of a wireless communication system using distributed antennas according to an exemplary embodiment of the present invention.

110: Base station
130: Large-area point
150: Small-area point
152, 154: Point
170, 171, 173, 175, 176: Terminal
210: Base station
211: Macro-cell
231, 233, 235, 237, 239: RRH
251, 253, 255, 257, 259: RRH cell

MODES OF THE INVENTION

While the invention is susceptible to various modifications and alternative forms, specific embodiments thereof are shown by way of example in the drawings and will herein be described in detail.

However, it should be understood that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein, including technical and scientific terms, have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "terminal" used herein may be referred to as a mobile station (MS), mobile terminal (MT), user equipment (UE), user terminal (UT), wireless terminal, access terminal (AT), subscriber unit, subscriber station (SS), wireless device, wireless communication device, wireless transmit/receive unit (WTRU), mobile node, mobile, or other terms.

The term "base station" used herein generally denotes a fixed point communicating with a terminal, and may be referred to as a Node-B, evolved Node-B (eNode-B), base transceiver system (BTS), access point (AP), and other terms.

The term "point" used herein denotes a transmission/reception apparatus that has at least one transmitting and receiving antenna and can exchange information with a base station connected through an optical fiber, microwaves, etc., and may be referred to as a remote radio head (RRH), a remote radio unit (RRU), a site, a distributed antenna, and so on.

As used herein, a point may be referred to as a transmission point (TP) when it transmits a signal, and as a reception point (RP) when it receives a signal.

Hereinafter, exemplary embodiments of the present invention will be described in detail with reference to accompanying drawings. Like numbers refer to like elements throughout description of the drawings, and description of the same elements will not be reiterated.

FIG. 1 is a conceptual diagram of a wireless communication system using distributed antennas according to an exemplary embodiment of the present invention.

Referring to FIG. 1, a wireless communication system using distributed antennas according to an exemplary embodiment of the present invention may include a base station 110, a large-area point 130 and small-area points 150, and the large-area point 130 and the small-area points 150 may be present in a cell 111 managed by the base station 110.

The large-area point 130 forms large transmission coverage 131 using high transmission power, and the small-area points 150 form smaller transmission coverage 151 than the transmission coverage 131 of the large-area point 130 using lower transmission power than the large-area point 130.

Also, as shown in FIG. 1, the respective transmission coverage 151 of the plurality of small-area points 150 may be disposed to be included in the transmission coverage 131 of the large-area point 130, and the small-area points 150 may be connected with the large-area point 130 wirelessly or through a cable to exchange control information and/or data. The plurality of small-area points 150 and the large-area point 130 are connected with the base station 110 through an optical fiber, microwave, etc. to exchange information with the base station 110 and exchange information with other points via the base station 110.

In the wireless communication system as shown in FIG. 1, two methods may be used to assign physical cell identities (PCIs) to the respective points 130 and 150.

In a first PCI assignment method, assignment is performed so that all the points 130 and 150 have different PCIs, and each of the points 130 and 150 forms individual cell coverage. The Third Generation Partnership Project (3GPP) Long Term Evolution (LTE) Release-8 and Release-9 and LTE-Advanced Release-10 standards may be applied to the first method and used.

In a second PCI assignment method, the same PCI is assigned to all the points 130 and 150 belonging to the same cell. The aforementioned 3GPP LTE or LTE-Advanced standards cannot be efficiently applied to the second method.

A wireless communication system using distributed antennas according to an exemplary embodiment of the present invention provides a downlink communication method and an uplink communication method for communication of points when all points belong to the same cell and are assigned the same PCI. In exemplary embodiments of the present invention below, it is assumed that communication between a base station and a terminal conforms to the 3 GPP LTE-Advanced Release-10 standard.

First, a downlink communication method of a wireless communication system using distributed antennas according to an exemplary embodiment of the present invention will be described.

FIG. 2 illustrates a downlink communication method of a wireless communication system using distributed antennas according to an exemplary embodiment of the present invention.

With reference to FIG. 2, a downlink communication method of a wireless communication system using distributed antennas according to an exemplary embodiment of the present invention will be described in detail below according to respective downlink physical channels and reference signals (RSs).

Frame Synchronization

In a downlink communication method using distributed antennas according to an exemplary embodiment of the present invention, it is assumed that radio frames transmitted by all points are synchronized with each other. Since all the radio frames are synchronized with each other, it is also assumed that subframes and orthogonal frequency division multiplexing (OFDM) symbols constituting a radio frame are synchronized.

Synchronization Signal and Cell-Specific Reference Signal

In a downlink communication method using distributed antennas according to an exemplary embodiment of the present invention, there are generally two methods of transmitting a synchronization signal and a cell-specific reference signal (CRS). Here, the CRS is used for a terminal to estimate a downlink channel and demodulate a received signal on the basis of the estimated downlink channel.

In a first method, a specific one (e.g., a large-area point) of points transmits a synchronization signal and a CRS corresponding to a PCI using a transmitting antenna of the specific point itself, and other points (e.g., small-area points) transmit no signal on radio resources used by the specific point to transmit the synchronization signal and the CRS.

In a second method, all points simultaneously transmit synchronization signals and CRSs corresponding to a PCI using the same radio resources.

Here, the radio resources denote resource elements (REs) in the time-frequency domain defined in the 3 GPP LTE and LTE-Advanced standards.

CSI Reference Signal

Each point may transmit its channel state information (CSI) RS. Here, the CSI RS is an RS used by a terminal to measure the quality of a downlink channel. Configurations of CSI RSs transmitted by respective points and mappings of radio resources corresponding to the configurations may differ from each other. Also, a CSI RS sequence used for each point to transmit its CSI RS may be generated using a PCI.

Physical Multicast Channel or PMCH

All points belonging to the same cell may transmit a physical multicast channel (PMCH) using the same radio resources. Here, the PMCH denotes a physical channel used for a multicast-broadcast single frequency network (MBSFN) operation.

Physical Broadcast Channel or PBCH

A physical broadcast channel (PBCH) is a physical channel used to transmit system information required for a terminal to access a network. A downlink communication method using distributed antennas according to an exemplary embodiment of the present invention provides two methods of transmitting a PBCH.

In a first method, a large-area point transmits a PBCH. In PBCH transmission, the large-area point uses a PCI to generate a scrambling sequence for bit-level scrambling as defined in LTE and LTE-Advanced standards. Meanwhile, at least one small-area point transmits no signal on radio resources used by the large-area point to transmit the PBCH.

In a second method, all points belonging to the same cell simultaneously transmit the same PBCH using the same radio resources. In PBCH transmission, the respective points use a PCI to generate scrambling sequences for bit-level scrambling as defined in LTE and LTE-Advanced standards.

Physical Control Format Indicator Channel or PCFICH

A physical control format indicator channel (PCFICH) is a downlink physical channel used to provide terminals with information required for decoding a physical downlink control channel (PDCCH). A downlink communication method using distributed antennas according to an exemplary embodiment of the present invention provides two methods of transmitting a PCFICH.

In a first method, a large-area point transmits a PCFICH. Here, the large-area point uses a PCI for radio resource mapping for PCFICH transmission and generation of a scrambling sequence for bit-level scrambling as defined in LTE and LTE-Advanced standards. Meanwhile, at least one small-area point transmits no signal on radio resources used by the large-area point to transmit the PCFICH.

In a second method, all points belonging to the same cell simultaneously transmit the same PCFICH using the same radio resources. In PCFICH transmission, the respective points use a PCI to generate scrambling sequences for bit-level scrambling as defined in LTE and LTE-Advanced standards.

Physical Downlink Control Channel or PDCCH

A PDCCH is a downlink physical channel used to transmit downlink control information (DCI) such as a scheduling assignment required for a terminal to receive a physical downlink shared channel (PDSCH), and to transmit information such as a scheduling grant for the terminal to transmit a physical uplink shared channel (PUSCH).

A downlink communication method using distributed antennas according to an exemplary embodiment of the present invention provides two methods of transmitting a PDCCH.

In a first method, a large-area point transmits a PDCCH. In PDCCH transmission, the large-area point uses a PCI for radio resource mapping and generation of a scrambling sequence for bit-level scrambling as defined in LTE and LTE-Advanced standards. Meanwhile, at least one small-area point transmits no signal on radio resources used by the large-area point to transmit the PDCCH.

In a second method, all points belonging to the same cell simultaneously transmit the same PDCCH using the same radio resources. In PDCCH transmission, the respective points use a PCI to generate scrambling sequences for bit-level scrambling as defined in LTE and LTE-Advanced standards.

Physical Hybrid ARQ Indicator Channel or PHICH

A physical hybrid automatic repeat request (ARQ) indicator channel (PHICH) is a downlink physical channel used to transmit a hybrid ARQ (HARQ) acknowledgement for notifying a terminal of whether or not there is a retransmission of a transport block.

A downlink communication method using distributed antennas according to an exemplary embodiment of the present invention provides two methods of transmitting a PHICH.

In a first method, a large-area point transmits a PHICH. In PHICH transmission, the large-area point uses a PCI to generate a cell-specific scrambling sequence as defined in LTE and LTE-Advanced standards. Meanwhile, at least one small-area point transmits no signal on radio resources used by the large-area point to transmit the PHICH.

In a second method, all points belonging to the same cell simultaneously transmit the same PHICH using the same radio resources. In PHICH transmission, the respective points use a PCI to generate scrambling sequences for bit-level scrambling as defined in LTE and LTE-Advanced standards.

MBSFN Reference Signal

An MBSFN RS is an RS used to measure a composite channel of points to each of which a terminal transmits MBSFN data. In a downlink communication method using distributed antennas according to an exemplary embodiment of the present invention, each point can transmit an MBSFN RS. Here, respective points may transmit MBSFN RSs using the same radio resources and the same sequence.

Positioning Reference Signal

A positioning reference signal (PRS) is a signal transmitted so that a base station and/or points can effectively estimate the position of a terminal. The terminal measures the PRS, calculates its position on the basis of a measured value, and transmits the position to the base station and/or the points, or transmits information required for calculating the position of the terminal, thereby enabling the base station and/or the points to determine the position of the terminal.

A downlink communication method using distributed antennas according to an exemplary embodiment of the present invention provides two methods of transmitting a PRS.

In a first method, a large-area point transmits a PRS. Here, the large-area point uses a PCI for generation of a sequence of a PRS and radio resource mapping of the PRS as defined in LTE-Advanced standards. Meanwhile, at least one small-area point transmits no signal on radio resources used by the large-area point to transmit the PRS.

In a second method, all points belonging to the same cell simultaneously transmit the same PRS using the same radio resources. Here, the respective points use a PCI for generation of a sequence of the PRS and radio resource mapping of the PRS as defined in LTE-Advanced standards.

Introduction of Virtual Cell Identity

A downlink communication method using distributed antennas according to an exemplary embodiment of the present invention introduces a virtual cell identity (VCI) for a terminal supporting the LTE-Advanced Release-11 standard or later standards in a network deployment environment in which a plurality of points belong to the same cell.

In the LTE-Advanced Release-10 standard, an RS sequence used for a UE-specific RS is defined as a pseudo-random sequence, and an initialization value used for generating the pseudo-random sequence is defined to vary according to a PCI. Thus, cells having different PCIs use different pseudo-random sequences as RS sequences. In this way, different cells generate different pseudo-random sequences using different PCIs so as to mitigate inter-cell interference. In particular, all cells use the same radio resources for RSs corresponding to antenna ports 7, 8, 9, 10, 11, 12, 13 and 14, and thus adjacent cells need to use different RS sequences to mitigate interference caused by RSs transmitted from the adjacent cells.

Meanwhile, when a plurality of points transmit different data using the same resources in a wireless communication environment in which distributed antennas are used as shown in FIG. 1, TPs need to use different RS sequences so as to mitigate interference of signals transmitted by neighboring points.

In order for TPs to use different RSs as mentioned above, the respective TPs may use different initialization values when generating pseudo-random sequences used for generating UE-specific RS sequences.

Figure 3:
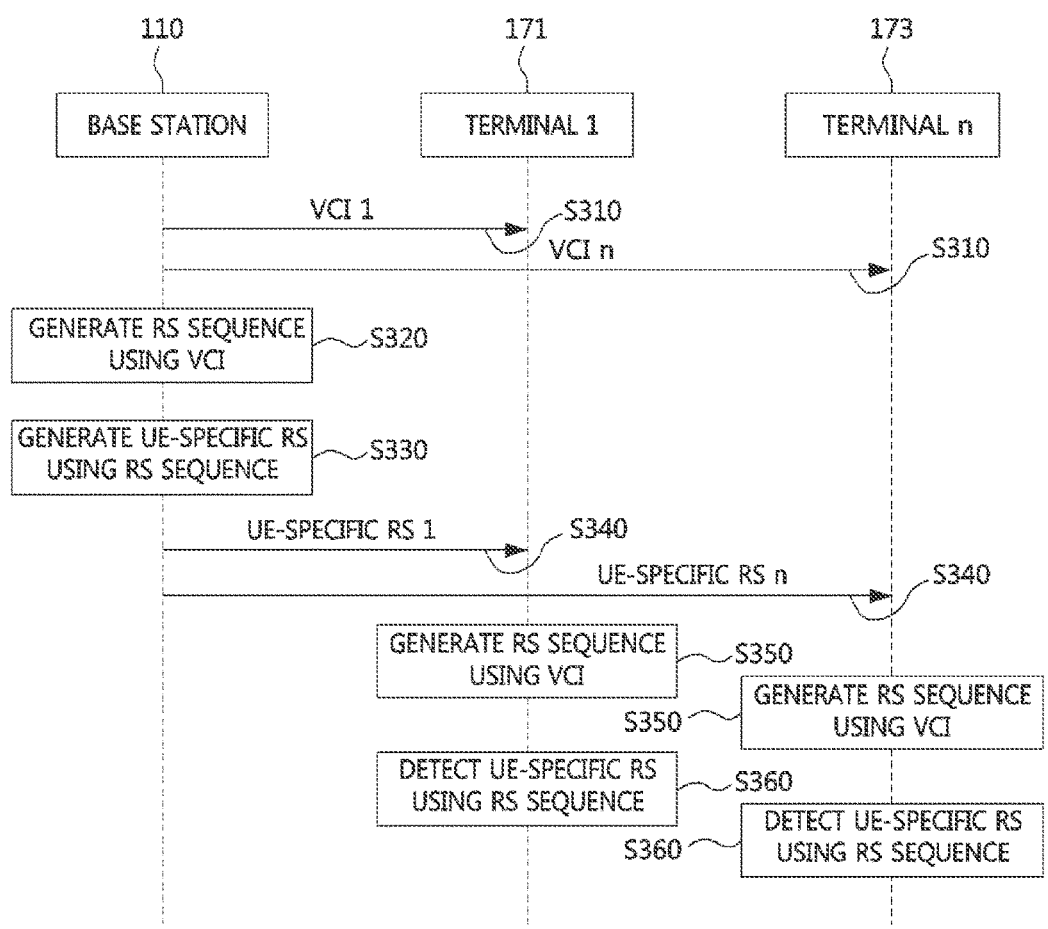
FIG. 3 is a flowchart illustrating an example of use of a virtual cell identity (VCI) in a downlink communication method using distributed antennas according to an exemplary embodiment of the present invention.

FIG. 3 is a flowchart illustrating an example of use of a VCI in a downlink communication method using distributed antennas according to an exemplary embodiment of the present invention.

Referring to FIG. 3, first, a base station 110 notifies terminals 171 and 173 of VCIs, respectively (step S310).

Subsequently, the base station 110 generates pseudo-random sequences using the VCIs instead of a PCI, and thereby generates RS sequences (step S320). Thereafter, the base station 110 generates UE-specific RSs of the respective terminals 171 and 173 using the generated RS sequences (step S330), and then transmits the generated UE-specific RSs of the respective terminals 171 and 173 to the corresponding terminals (step S340). Here, different values can be assigned as the VCIs to different terminals.

The respective terminals 171 and 173 generate RS sequences using the VCIs assigned by the base station 110 (step S350), and detect the UE-specific RSs using the generated RS sequences (step S360).

In the case of PDSCH transmission, to generate a scrambling sequence used for bit-level scrambling of each codeword, a base station may generate a pseudo-random sequence by applying a VCI instead of a PCI. In this case, a terminal generates a scrambling sequence using a VCI assigned by the base station, and then performs PDSCH detection using the generated scrambling sequence.

A method of using a VCI in a downlink communication method using distributed antennas according to an exemplary embodiment of the present invention will be described in detail below.

Physical Downlink Shared Channel or PDSCH

For a terminal supporting the LTE or LTE-Advanced Release-8/9/10 standard, a pseudo-random sequence is generated using a PCI, thereby generating a scrambling sequence used for bit-level scrambling of each codeword.

For a terminal supporting the LTE-Advanced Release-11 standard or later standards and assigned a VCI, a scrambling sequence may be generated using the VCI instead of a PCI.

When a terminal supporting the LTE-Advanced Release-11 standard or later standards is not assigned a VCI, a scrambling sequence may be generated using a PCI. For example, in a process in which a terminal performs random access to access a network, the terminal has not yet been assigned a VCI. Thus, a base station generates a scrambling sequence by applying a PCI to response to random access of the terminal and message transmission, and then performs bit-level scrambling of an encoded codeword using the generated scrambling sequence.

A downlink communication method using distributed antennas according to an exemplary embodiment of the present invention provides two methods of transmitting a PDSCH.

In a first method, a large-area point transmits a PDSCH. A terminal may demodulate the PDSCH received from the large-area point using a CRS or a UE-specific RS according to a transmission mode.

Meanwhile, when the terminal is configured with a transmission mode in which the terminal obtains channel estimation and channel quality indicator (CQI) information using a CSI RS and performs data demodulation using a UE-specific RS, at least one small-area point may transmit a PDSCH and a UE-specific RS to the terminal.

On the other hand, when the terminal is configured with a transmission mode in which the terminal obtains channel estimation and CQI information and performs data demodulation using a CRS, at least one small-area point may transmit no PDSCH to the terminal. This is because the at least one small-area point transmits no CRS to the terminal in the first method.

In a second method, when the terminal is configured with the transmission mode in which the terminal obtains channel estimation and CQI information using a CSI RS and performs data demodulation using a UE-specific RS, each point belonging to the same cell transmit a PDSCH and a UE-specific RS to the terminal.

On the other hand, when the terminal is configured with the transmission mode in which the terminal obtains channel estimation and CQI information and performs data demodulation using a CRS, all points belonging to the same cell simultaneously transmit the same PDSCH to the terminal.

UE-Specific Reference Signal

Each of points belonging to the same cell may transmit a PDSCH and a UE-specific RS together.

Here, each point generates a UE-specific RS sequence for a terminal assigned a VCI using the VCI instead of a PCI and transmits the UE-specific RS sequence to the terminal, and the terminal receiving the UE-specific RS sequence detects a UE-specific RS using an RS sequence that is generated using the assigned VCI.

Also, each point generates a UE-specific RS sequence for a terminal assigned a VCI using the VCI instead of a PCI and transmits the UE-specific RS sequence to the terminal, and the terminal receiving the UE-specific RS sequence generates an RS sequence using the VCI and detects a UE-specific RS.

Further, for a terminal assigned a VCI, each point uses radio resources determined using the VCI instead of a PCI in radio resource mapping of a signal (e.g., a UE-specific RS) transmitted through antenna port 5.

On the other hand, each point generates a UE-specific RS sequence using a PCI and transmits the UE-specific RS sequence to a terminal not assigned a VCI, and the terminal receiving the UE-specific RS sequence detects a UE-specific RS using an RS sequence that is generated using the PCI.

Also, for a terminal not assigned a VCI, each point uses radio resources determined by the PCI in radio resource mapping of a signal transmitted through antenna port 5.

Introduction of e-PDCCH and e-PHICH

In a downlink communication method using distributed antennas according to an exemplary embodiment of the present invention, respective points belonging to the same cell introduce new physical channels that can respectively perform functions of a PDCCH and a PHICH defined in the LTE or LTE-Advanced standard.

In an exemplary embodiment of the present invention, a new physical channel capable of performing the function of a PDCCH is referred to as e-PDCCH, and a new physical channel capable of performing the function of a PHICH is referred to as e-PHICH.

Each of points belonging to the same cell transmits an e-PDCCH, an e-PHICH and a UE-specific RS together so that a terminal can demodulate the e-PDCCH and the e-PHICH. Here, the e-PDCCH and the e-PHICH may be transmitted using some of radio resources that can be used for PDSCH transmission by a large-area point.

Also, each point may use a VCI for radio resource mapping of the e-PDCCH and the e-PHICH and generation of a scrambling sequence for bit-level scrambling.

Introduction of RRH-PRS

In a downlink communication method using distributed antennas according to an exemplary embodiment of the present invention, a new RS is introduced to improve accuracy of terminal positioning. In the present invention, the new RS is referred to as RRH-PRS.

A plurality of points belonging to the same cell may transmit an RRH-PRS for terminal positioning. Here, each point may use a VCI for generation of a sequence of the RRH-PRS and radio resource mapping of the RRH-PRS.

CSI RS-Based Measurement

In a downlink communication method using distributed antennas according to an exemplary embodiment of the present invention, a CSI RS-based measurement is performed.

FIG. 4 is a flowchart illustrating a CSI RS-based measurement process in a downlink communication method using distributed antennas according to an exemplary embodiment of the present invention.

Referring to FIG. 4, first, a base station 110 transmits, terminal-specifically, CSI RS measurement information to terminals (step S410). Here, the CSI RS measurement information may include configuration information corresponding to all or some of CSI RSs transmitted by respective points, and is set so that a terminal 170 can obtain radio resource pattern information on the time-frequency domain of the CSI RSs from the configuration information according to a predetermined mapping rule.

The terminal 170 receiving the information for CSI RS measurement transmitted from the base station 110 measures the CSI RSs included in the CSI RS measurement information (step S420), and transmits the measurement results to the base station 110 (step S430).

The base station 110 determines a CSI RS pattern or CSI RS patterns, which need to be measured by the terminal 170, on the basis of the measurement results received from the terminal 170 (step S440), and informs the terminal 170 (step S450) of the determined CSI RS pattern or CSI RS patterns.

The terminal 170 obtains CSI for link adaptation using the CSI RS pattern or CSI RS patterns received from the base station 110 (step S460), and reports the obtained CSI to the base station 110 (step S470).

The base station 110 performs link adaptation on the basis of the CSI received from the terminal 170 (step S480).

In the CSI RS-based measurement process according to an exemplary embodiment of the present invention, the CSI RS pattern or CSI RS patterns configured for the terminal 170 by the base station 110 may belong to one point or a plurality of points.

Once CSI RS is configured by the base station 110, the terminal obtains CSI using the configured CSI RS and transmits the obtained CSI to the base station 110. Here, the terminal 170 assumes that no PDSCH is transmitted through REs in which the CSI RS is transmitted. In other words, the base station performs resource mapping so that REs for CSI RS transmission and REs for PDSCH transmission do not overlap each other.

Cooperative Transmission Between Plurality of TPs

In a downlink communication method using distributed antennas according to an exemplary embodiment of the present invention, coordinated multipoint (CoMP) transmission in which a base station transmits data or control information to a terminal using a plurality of TPs can be performed.

In exemplary embodiments of the present invention below, a set of TPs performing cooperative transmission for a terminal will be referred to as a "cooperating point set."

FIG. 5 is a flowchart illustrating a process of performing CoMP transmission in a downlink communication method using distributed antennas according to an exemplary embodiment of the present invention.

First, a base station 110 receives CSI from each terminal 170 (step S510).

Then, the base station 110 determines a cooperating point set, which will perform CoMP transmission for the terminal 170, on the basis of the received CSI (step S520). In other words, the cooperating point set may vary according to a channel environment of each terminal 170.

A plurality of TPs 152 and 154 included in the cooperating point set that performs CoMP transmission for the terminal 170 generate transmission signals, which will transmit the same data using the same radio resources to the terminal 170, (step S530), and then transmit the generated transmission signals and UE-specific RSs for demodulation of the terminal 170 to the terminal 170 (step S540).

Here, the plurality of TPs performing CoMP transmission need to simultaneously transmit the UE-specific RSs as well, and need to use the same RS sequence. To this end, the plurality of TPs, which perform CoMP transmission, transmit PDSCHs and UE-specific RS sequences generated using VCIs of which the base station notifies the terminal.

Description will be made below about an uplink communication method using distributed antennas according to an exemplary embodiment of the present invention when all the transmission/reception points belong to the same cell and are assigned the same cell ID.

In an uplink communication method using distributed antennas according to an exemplary embodiment of the present invention, a terminal may transmit a PUSCH, a physical uplink control channel (PUCCH), a physical random access channel (PRACH), a demodulation (DM) RS and a sounding RS (SRS) through an uplink.

According to LTE release-8/9 and LTE-Advanced Release-10 standards, a PUSCH, a PUCCH, a DM RS and an SRS are generated using a PCI for the following functions:

Generation of a scrambling sequence of a PUSCH

Cell-specific symbol-level cyclic shift hopping (CSH) of PUCCH formats 1, 1a, 1b, 2, 2a and 2b Bit-level scrambling sequence generation, cell-specific single carrier-frequency division multiple access (SC- FDMA) symbol-level CSH, and cell-specific SC-FDMA symbol-level scrambling of PUCCH format 3

Base-sequence hopping, sequence-group hopping and sequence hopping of an SRS and a DM RS RS sequence generation and cell-specific slot-level CSH of a PUSCH DM RS RS sequence generation and cell-specific symbol-level CSH of a PUCCH DM RS Since terminals supporting the LTE Release-8/9/10 standard generate signals according to the corresponding standards, the terminals generate the aforementioned signals using the same PCI and transmit the generated signals.

Also, to increase spectrum use efficiency, resources used by a terminal may be reused according to the locations of terminals. In other words, terminals having relatively little interference to each other may transmit the aforementioned signals using the same resources.

Alternatively, to increase spectrum use efficiency by spatially reusing frequency resources, resources used by a terminal may be reused on an RP by RP basis, where an RP is a point receiving signals from terminals.

An uplink communication method using distributed antennas according to an exemplary embodiment of the present invention provides a method for a terminal to perform uplink transmission using a VCI.

Specifically, a terminal is assigned a VCI by a base station, generates some or all of uplink channels and signals (e.g., PUSCH, PUCCH, DM RS and SRS) using the assigned VCI instead of a PCI, and transmits the generated signals.

As described above, an exemplary embodiment of the present invention allows terminals associated with RPs that are neighboring each other to use different VCIs, thereby mitigating interference on received signals of the RPs.

Also, an uplink communication method as described above provides a similar effect as making respective RPs form cells with unique PCIs. In other words, terminals associated with different RPs belonging to the same cell are made as if the terminals belong to different cells.

The above-described uplink communication method using distributed antennas according to an exemplary embodiment of the present invention can be introduced into the LTE-Advanced Release-11 standard or later standards, and applied to terminals supporting the standards.

However, among the terminals supporting the LTE-Advanced Release-11 standard or the later standards, a terminal not assigned a VCI may generate the aforementioned channels and signals using a PCI.

For example, when a terminal performs initial random access to a cell, the terminal has not yet been assigned a VCI, and thus can use a PCI for transmission of a random access message, a PUCCH acknowledgement/negative acknowledgement (ACK/NAK), and so on.

The aforementioned VCI can be applied to a case in which a plurality of points belong to the same cell and have the same PCI as well as a case in which a plurality of points have different PCIs.

Also, VCI may be configured identically or differently in a downlink and an uplink. When the VCI is configured differently in a downlink and an uplink, a base station may separately signal VCI for the downlink and VCI for the uplink to a terminal.

In the above-described exemplary embodiment of the present invention, uplink/downlink communication methods using a VCI instead of a PCI have been described, but in another exemplary embodiment of the present invention, a PCI may be used as it is, and a new parameter may be added and used as an initialization parameter for generating a pseudo-random sequence.

When the initialization parameter for generating a pseudo-random sequence is newly added and used, a base station can notify a terminal of the initialization parameter. As the newly added initialization parameter, the same parameter or different parameters may be used in a downlink and an uplink.

In various ways, the terminal may be notified of a VCI or the newly added initialization parameter value.

For example, a VCI or the added initialization parameter may be mapped according to a CSI RS pattern. In other words, when the base station configures a CSI RS pattern for the terminal, a VCI or an additional initialization parameter value for the terminal may be determined according to a predetermined rule. This method may be applied when the same initialization parameter is used in the downlink and the uplink.

When different initialization parameters are used in the downlink and the uplink, the base station may perform mapping of an initialization parameter used for the downlink using a CSI RS pattern corresponding to the initialization parameter as mentioned above so that the terminal can know the initialization parameter. Also, an initialization parameter used for the uplink may be mapped in another method, or the base station may directly notify the terminal of the initialization parameter value.

Configuration of DM RS for Uplink PUSCH Demodulation

A method of configuring a DM RS used for PUSCH demodulation using a VCI in an uplink of a wireless communication system using distributed antennas according to exemplary embodiments of the present invention will be described below through an example.

In an exemplary embodiment of the present invention, interference between points in an uplink is randomized similar to that in a downlink, and a base sequence and CSH of a PUSCH DM RS can be separately configured.

For base sequence configuration of a PUSCH DM RS, a VCI $N_{ID}^{PUSCH\ DM\ RS}$ is introduced and $\Delta_{ss}$ is used. Also, a parameter $C_{init}$ used for initialization of hopping pattern generation is configured for PUSCH DM RS CSH configuration. Here, $N_{ID}^{PUSCH\ DM\ RS}$ and $\Delta_{ss}$ are used in the same meaning as defined in Section 5.5.1.3 and Section 5.5.1.4 of 3GPP technical specification (TS) 36.211, and $C_{init}$ denotes a parameter used in Section 5.5.2.1.1 of TS 36.211.

Specifically, referring to Section 5.5.1.3 of 3GPP TS 36.211, a sequence group number u in a slot $n_s$ is determined by a group hopping pattern $f_{gh}(n_s)$ and a sequence shift pattern $f_{ss}$ as shown in Equation 1.

$$n = (f_{gh}(n_s) + f_{ss}) \bmod 30 \quad \text{[Equation 1]}$$

Here, when group hopping is used, the group hopping pattern $f_{gh}(n_s)$ for a PUSCH DM RS is given by a pseudo-random sequence c(i). In the present invention, Equation 2 is used for initialization of a pseudo-random sequence generator. In other words, in the present invention, the VCI $N_{ID}^{PUSCH\ DM\ RS}$ is used instead of an existing PCI to perform initialization at the beginning of every radio frame as shown in Equation 2.

$$C_{init} = \left\lfloor \frac{N_{ID}^{PUSCHDMRS}}{30} \right\rfloor \quad \text{[Equation 2]}$$

Also, a PUSCH DM RS sequence pattern $f_{ss}^{PUSCH}$ can be obtained using Equation 3.

$$f_{ss}^{PUSCH} = (N_{ID}^{PUSCH\ DM\ RS} \bmod 30 + \Lambda_{ss}) \bmod 30 \quad \text{[Equation 3]}$$

In Equation 3, a base station transmits $N_{ID}^{PUSCH\ DM\ RS}$ and $\Lambda_{ss} \in \{0, 1, \ldots, 29\}$ values to the corresponding terminal through terminal-specific signaling.

Meanwhile, in Section 5.5.2.1.1 of 3GPP TS 36.11, it is defined that, in PUSCH DM RS sequence generation, a cyclic shift (CS) of a DM RS sequence varies through cell-specific hopping with a change of a slot number. Such CSH is determined by $n_{PN}(n_s)$, which is determined as shown in Equation 4 according to a slot number $n_s$.

$$n_{PN}(n_s) = \Sigma_{i=0}^{7} c(8N_{symb}^{UL} \cdot n_s + i) \cdot 2^i \quad \text{[Equation 4]}$$

Conventionally, Equation 5 is used for initialization of the pseudo-random sequence $c(i)$, and the value is determined cell-specifically.

$$C_{init} = \left\lfloor \frac{N_{ID}^{cell}}{30} \right\rfloor \cdot 2^5 + f_{ss}^{PUSCH} \quad \text{[Equation 5]}$$

In an exemplary embodiment of the present invention, a $C_{init}$ value is separately signaled to terminals.

In other words, a base station transmits $N_{ID}^{PUSCH\ DM\ RS}$, $\Lambda_{ss}$ and $C_{init}$ values to each terminal through terminal-specific signaling.

Specifically, first, a base station configures the following two parameter sets for a terminal through radio resource control (RRC) signaling.
$\{N_{ID}^{PUSCHDMRS(0)}, \Lambda_{ss}^{(0)}, C_{init}^{(0)}\}$, $\{N_{ID}^{PUSCHDMRS(1)}, \Lambda_{ss}^{(1)}, C_{init}^{(1)}\}$ Subsequently, the base station adds a 1-bit control field to DCI format 4, and notifies the terminal of a parameter set in use using the added control field as shown in Table 1.

The terminal becomes aware of the parameter set in use indicated in the control field, generates a PDSCH DM RS using the indicated parameter set, and then transmits the generated PDSCH DM RS to the base station.

TABLE 1

| PUSCH DM RS sequence indication field in DCI format 4 | $N_{ID}^{PUSCH\ DM\ RS}$ | $\Lambda_{ss}$ | $C_{init}$ |
|---|---|---|---|
| 0 | $N_{ID}^{PUSCH\ DM\ RS\ (0)}$ | $\Lambda_{ss}^{(0)}$ | $C_{init}^{(0)}$ |
| 1 | $N_{ID}^{PUSCH\ DM\ RS\ (1)}$ | $\Lambda_{ss}^{(1)}$ | $C_{init}^{(1)}$ |

In a situation in which no such dynamic sequence configuration has been for the terminal, a PUSCH DM RS is generated using an existing LTE Release-10 method.

Meanwhile, when terminals are assigned cell IDs in an environment in which a plurality of points belong to the same cell and have the same PCI, all legacy terminals (e.g., terminals ahead of 3GPP LTE Release-11) share the same PCI. Thus, the respective terminals use the same base sequence index (BSI) and CSH, and thus interference randomization is not achieved well. In order to solve this problem, it is beneficial not to allocate the same resources for terminals that can cause significant interference to each other.

In an exemplary embodiment of the present invention, to minimize interference between terminals in an environment as mentioned above, area splitting gain is enabled or orthogonality between terminals is maintained.

In other words, in the present invention, a method of differently configuring BSIs of respective terminals is used to obtain area splitting gain between terminals associated with different points.

Alternatively, in the present invention, the following methods may be used to make DM RSs of terminals allocated resources, some or all of which overlap, be orthogonal to each other. Here, only when sequence group hopping (SGH) is disabled, an orthogonal cover code (OCC) can be used.

Method 1 of giving DM RS orthogonality between terminals: all (BSI, CSH)s are configured to be identical. In other words, DM RS orthogonality is given using OCC and CS.

Method 2 of giving DM RS orthogonality between terminals: BSIs are configured to be different from each other, but CSHs are configured to be identical. In other words, DM RS orthogonality is given using OCC.

Method 3 of giving DM RS orthogonality between terminals: BSIs are configured to be identical, but CSHs are configured to be different from each other. In other words, DM RS orthogonality is given using CS.

Among the methods of giving DM RS orthogonality between terminals, Method 2 of giving DM RS orthogonality using OCC can provide better orthogonality than Method 1. Also, when DM RS orthogonality is given by applying different CSs to respective terminals according to Method 3, if two CSs collide or are adjacently positioned, it is difficult to maintain DM RS orthogonality between the terminals, and thus caution is required.

Meanwhile, when BSIs and CSHs are different, it is not possible to give DM RS orthogonality.

Also, when terminals are assigned cell IDs in an environment in which a plurality of points belong to the same cell and have the same PCI, terminals associated with different points configure BSIs to be different from each other so as to obtain area splitting gain and orthogonality between themselves.

Terminals positioned at a boundary between adjacent points can give DM RS orthogonality using one of the aforementioned three methods of giving DM RS orthogonality between terminals. On the other hand, DM RS orthogonality may be given for multi-user (MU) multiple-input multiple-output (MIMO) pairing with legacy terminals.

Improvement of Uplink PUCCH

When different PCIs are assigned to a plurality of points, interference randomization between the points is naturally achieved. However, to improve reception performance of a PUCCH transmitted from a terminal positioned at a boundary between cells managed by respective points, orthogonalization between the points may be needed.

For orthogonalization between transmission/reception points in an environment as mentioned above, PUCCH resources may be allocated to be orthogonal to each other.

Meanwhile, when a plurality of points belonging to the same cell are assigned the same PCI, a large-area point and small-area points all in the same cell have the same cell ID. Thus, orthogonalization between the points can be achieved, but interference randomization is not achieved between points receiving signals. Consequently, RP-specific interference randomization is needed.

Here, when the aforementioned e-PDCCH is introduced, for area splitting gain, PUCCH regions, which are determined by the e-PDCCH, may be configured to overlap each other between the RPs. In this case, interference between TPs needs to be mitigated using different PUCCH randomization between different TPs.

FIG. 6 is a conceptual diagram illustrating a need to improve a PUCCH in a wireless communication system using distributed antennas.

As shown in FIG. 6, in a CoMP Scenario 3 deployment environment in which a large-area point (or high-power point) 130 and a small-area point (or low-power point) 150 coexist, a TP that transmits a downlink PDCCH and an RP that receives a PUCCH may differ from each other depending on according to terminals.

For example, there may be a case in which a 3GPP Release-11 terminal 175 and a legacy terminal 176 receive a PDCCH from the same large-area point 130, the Release-11 terminal 175 transmits a PUCCH to the small-area point 150, and the legacy terminal 176 transmits a PUCCH to the large-area point 130. In this case, the PUCCH that is transmitted with high power by the legacy terminal 176 associated with the large-area point 130 may cause strong interference to the PUCCH transmitted by the Release-11 terminal 175.

Thus, ACK/NACK resource regions need to be differently assigned. In other words, when two terminals at adjacent positions have different PUCCH TPs, their ACK/NACK resource regions need to be separated to achieve PUCCH orthogonalization. This is because, when there is one PDCCH TP but there are different PUCCH RPs, PUCCH sequences and CSH are differently configured, and thus resources cannot be multiplexed into the same resources.

Here, when an e-PDCCH is introduced, a PUCCH resource region determined by the e-PDCCH needs to be assigned to a position that does not overlap a dynamic PUCCH resource region assigned to a legacy terminal.

For these reasons described above, existing PUCCHs need to be improved.

PUCCH improvement applied to a wireless communication system using distributed antennas according to an exemplary embodiment of the present invention will be described in detail below.

First, a PUCCH DM RS base sequence and a CSH pattern are generated using a VCI $N_{ID}^{PUCCH}$ for a PUCCH. Here, the VCI $N_{ID}^{PUCCH}$ for a PUCCH and a VCI $N_{ID}^{PUSCH\ DM\ RS}$ for a PUSCH DM RS are separately configured. Also, transmission resources of PUCCH format 1a/1b used for transmitting a HARQ-ACK are determined by a lowest control channel element (CCE) index of a PDCCH and a parameter $N_{PUCCH}^{(1)}$.

Here, by enabling terminal-specific configuration of $N_{PUCCH}^{(1)}$, a PUCCH resource region can be configured terminal-specifically for each terminal in accordance with the channel situation of the terminal. This can be particularly used for allocating orthogonal PUCCH resources between RPs.

FIG. 7 is a conceptual diagram of a PUCCH resource allocation method applicable to a wireless communication system using distributed antennas according to an exemplary embodiment of the present invention, illustrating an example of a PUCCH resource allocation method for achieving orthogonality and interference randomization between RPs of a PUCCH whose resources are configured through RRC signaling.

In a CoMP environment in which a point TP1 and a point TP2 are placed within the coverage of a point TP0 as shown in FIG. 7, PUCCH resources 1-0, PUCCH resources 1-1 and PUCCH resources 1-2 that use frequency resources overlapping each other are allocated as PUCCH transmission resources for terminals positioned inside the areas of the point TP0, the point TP1 and the point TP2 respectively, so that interference randomization between the point TP0, the point TP1 and the point TP2 operating as RPs can be achieved.

Also, PUCCH resource 2 can be allocated as PUCCH transmission resources for terminals located between the point TP1 and the point TP2 in common, and the resources used by the terminals can be configured to be orthogonal to each other. Likewise, PUCCH resource 3 can be used as orthogonal resources of the point TP0, the point TP1 and the point TP2 operating as RPs.

Meanwhile, when PUCCH resources 1-0, PUCCH resources 1-1 and PUCCH resources 1-2 are configured to have different VCIs in CoMP scenario 4, interference randomization between RPs is enabled. However, since a legacy terminal cannot be assigned a VCI, the legacy terminal and a terminal assigned a VCI (e.g., terminal of 3GPP Release-11 or the later) cannot be multiplexed into the same PUCCH resources.

The terminals using PUCCH resource 2 are allocated the same VCI regardless of whether or not a point receiving a PUCCH is the point TP1 and/or the point TP2, so that the terminals can be multiplexed into the same PUCCH resources. At the same time, for interference randomization between an RP and the point TP0 in a resource region overlapping PUCCH resource 1-1, it is necessary to assign a VCI different from a VCI used for PUCCH resource 1-1 to the terminals that use PUCCH resource 2. PUCCH resource 3 can be used as orthogonal resources between the point TP0, the point TP1 and the point TP2, and terminals that use an existing PCI with no VCI configured can be allocated the same resources maintaining orthogonality between RPs.

In CoMP Scenario 3, PUCCH resources 1-0, PUCCH resources 1-1 and PUCCH resources 1-2, even with no VCIs configured, achieve interference randomization between RPs if different PCIs are used between them. Meanwhile, the terminals using PUCCH resource 2 are allocated the same VCI regardless of whether or not a point receiving a PUCCH is the point TP1 and/or the point TP2, so that the terminals can be multiplexed into the same PUCCH resources. At the same time, for interference randomization between the point TP0 and an RP in a resource region overlapping PUCCH resource 1-1, a VCI different from a VCI used for PUCCH resource 1-1 may be assigned to the terminals that use PUCCH resource 2.

Configuration of Downlink DM RS Sequence

To generate a downlink DM RS sequence in an exemplary embodiment of the present invention, $c_{init} = (\lfloor n_s/2 \rfloor + 1) \cdot (2N_{ID}^{cell} + 1) \cdot 2^{16} + n_{SCID}$, which is used for initializing random sequence generation in 3GPP TS 36.211 Section 7.2, is modified as shown in Equation 6 and used.

$$c_{init} = (\lfloor n_s/2 \rfloor + 1) \cdot (2N_{ID}^{cell} + 1) \cdot 2^{16} + n_{SCID} + m_{SC} \qquad \text{[Equation 6]}$$

In Equation 6, $m_{SC}$ may be determined through signaling from a base station to a terminal, or through implicit mapping.

Meanwhile, assuming that the terminal detects an e-PDCCH, obtains control information contained in the e-PDCCH, and then receives and demodulates a PDSCH, the terminal needs to know a DM RS sequence used for demodulating the e-PDCCH to demodulate the e-PDCCH. The terminal can use Equation 7 for initializing DM RS sequence generation.

$$c_{init} = (\lfloor n_s/2 \rfloor + 1) \cdot (2N_{ID}^{vcell} + 1) \cdot 2^{16} + n_{SCID} \qquad \text{[Equation 7]}$$

Also, when the base station configures a VCI and $n_{SCID}$ for the terminal for interference randomization of a DM RS as described above, the terminal substitutes the VCI value for a PCI (i.e., $N_{ID}^{cell}$) in DM RS sequence initialization, and can obtain a DM RS sequence for e-PDCCH demodulation using the configured $n_{SCID}$. Alternatively, a predetermined fixed value (e.g., 0), which is not configured by the base station, can be used as $n_{SCID}$.

On the other hand, the terminal needs to know a DM RS sequence used for PDSCH demodulation so as to demodulate a PDSCH. In this case, the base station can notify the terminal of an initial value setting of the DM RS sequence through RRC configuration and an e-PDCCH. In other words, the base station can set one VCI value or a plurality of VCI values for the terminal, and then dynamically notify the terminal of a VCI value and an $n_{SCID}$ value, which will be used for initializing the DM RS sequence by the terminal, using a DCI field included in a PDCCH or an e-PDCCH.

For example, assuming that the base station can set two VCI values $\{N_{ID\_0}^{vcell}, N_{ID\_1}^{vcell}\}$ for the terminal through RRC signaling, and $n_{SCID}$ can have two values, the base station can notify the terminal of a VCI value and an $n_{SCID}$ value, which will be used for initializing the DM RS sequence for PDSCH demodulation, as shown in Table 2 using 2-bit control information N_init included in a PDCCH or an e-PDCCH transmitted to the terminal.

TABLE 2

| N_init | $N_{ID}^{vcell}$ | $n_{SCID}$ |
|---|---|---|
| 0 | $N_{ID\_0}^{vcell}$ | 0 |
| 1 | $N_{ID\_0}^{vcell}$ | 1 |
| 2 | $N_{ID\_1}^{vcell}$ | 0 |
| 3 | $N_{ID\_1}^{vcell}$ | 1 |

In another method for a base station to notify a terminal of a VCI value for initializing a DM RS sequence for PDSCH demodulation, the base station sets two VCI values $N_{ID}^0$ and $N_{ID}^1$ for the terminal through RRC signaling, and adds one bit to each of DCI format 2B and format 2C, thereby notifying the terminal of a VCI value to be used by the terminal as shown in Table 3. Here, DCI formats 2B and 2C are the same as described in 3GPP TS 36.212.

For PDSCH transmission and reception, each of the base station and the terminal generates a sequence by substituting the VCI value for a PCI (i.e., $N_{ID}^{cell}$) in the sequence generation initialization equation. This method has an advantage in that, when one of the two VCI values is set as $N_{ID}^{cell}$, it is possible to perform MU MIMO pairing with a legacy terminal using the set value and orthogonal RSs. Meanwhile, when no VCI is configured for the terminal, a sequence can be generated using $X_{ID}=N_{ID}^{cell}$ (i.e., a PCI).

TABLE 3

| VCI field in DCI format 2B or 2C | $X_{ID}$ |
|---|---|
| 0 | $N_{ID}^0$ |
| 1 | $N_{ID}^1$ |

The range of a VCI value may include the range of an existing PCI value. Currently, a PCI value can be an integer from 0 to 503. In an exemplary embodiment of the present invention, a VCI value can be an integer from 0 to Max_VCI, and Max_VCI can be 503 or a larger integer. When a VCI value is set to be beyond the range of an existing PCI value, it is advantageous for interference randomization between cells. On the other hand, when a VCI value is set to one of existing PCI values, it is possible to assign orthogonal DM RS ports between legacy terminals that cannot be assigned VCI and terminals that have been assigned VCI.

In another example of a method of setting an initial value for generating a DM RS sequence that is used to demodulate an e-PDCCH by a terminal, Equation 8 is used.

$$c_{init}=(\lfloor n_s/2 \rfloor+1) \cdot (2N_{ID}^{cell}+1) \cdot 2^{16} n_{SCID}+m_{SC} \quad [\text{Equation 8}]$$

In Equation 8, 2 to a power of 2 with the exponent correspond to a bit width may be multiplied so that $n_{SCID}$ and $m_{SC}$ values can independently influence the setting of an initial value $c_{init}$. For example, when $n_{SCID}$ has one bit, it is possible to configure that $m_{SC}=2q_{SCID}$ and when $n_{SCID}$ has L bits, it is possible to configure that $m_{SC}=2^L q_{SCID}$. Here, $q_{SCID}$ can have a value expressed by (16-L) bits at maximum.

The base station can set the (or) value for the terminal. Values that $q_{SCID}$ can have may include 0.

When the base station sets $m_{SC}$ and $n_{SCID}$ values for the terminal for interference randomization of a DM RS for e-PDCCH demodulation as described above, the terminal can obtain a DM RS sequence for e-PDCCH demodulation using the $m_{SC}$ value and the $n_{SCID}$ value set for the terminal itself in DM RS sequence initialization. Here, a value (e.g., 0) that is not set by the base station but has been fixed in advance may be used as $n_{SCID}$, and to this end, the $n_{SCID}$ value may be defined in a standard in advance.

On the other hand, the terminal needs to know a DM RS sequence used for PDSCH demodulation so as to demodulate a PDSCH. In this case, the base station can notify the terminal of an initial value setting of the DM RS sequence through RRC configuration and a PDCCH or an e-PDCCH. In other words, the base station can set one $m_{SC}$ value or a plurality of $m_{SC}$ values for the terminal, and then dynamically notify the terminal of an $m_{SC}$ value and an $n_{SCID}$ value, which will be used for initializing the DM RS sequence by the terminal, using a DCI field included in a PDCCH or an e-PDCCH.

For example, assuming that the base station can set two $q_{SCID}$ values $\{q_0, q_1\}$ for setting two $m_{SC}$ values for the terminal through RRC signaling, and $n_{SCID}$ can have two values, the base station can notify the terminal of a $q_{SCID}$ value and an $n_{SCID}$ value, which will be used for initializing the DM RS sequence for PDSCH demodulation, as shown in Table 4 using 2-bit control information N_init included in a PDCCH or an e-PDCCH transmitted to the terminal.

TABLE 4

| N_init | $q_{SCID}$ | $n_{SCID}$ |
|---|---|---|
| 0 | $q_0$ | 0 |
| 1 | $q_0$ | 1 |
| 2 | $q_1$ | 0 |
| 3 | $q_1$ | 1 |

In a method of dynamically configuring a VCI in an uplink, a base station may notify a terminal of information on a predetermined number of VCIs in advance through RRC signaling, and may indirectly notify the terminal of a VCI to be used for transmission by the terminal through a control field in DCI.

In other words, the base station may indicate a VCI index in a control field in DCI, and the terminal may obtain the VCI index from the received DCI and then transmit a PUSCH, PUCCH, DM RS, SRS, etc. using a VCI corresponding to the obtained VCI index. For example, the base station can designate a VCI index in DCI for uplink scheduling grant in the cases of a PUSCH and a DM RS, and in DCI for downlink scheduling assignment in the case of a PUCCH.

Uplink Power Control

[Uplink Power Control Based on CRS]

A terminal estimates a wireless channel for PDCCH demodulation using a CRS, and then performs the demodulation on the basis of the estimated wireless channel.

Also, the terminal performs PDSCH demodulation using a DM RS or a CRS according to a configured transmission mode.

Assuming that the terminal is configured with a transmission mode in which the terminal estimates CSI using a CRS and performs PDSCH demodulation, uplink power control according to an exemplary embodiment of the present invention will be described first.

Methods of controlling the uplink power of a terminal are generally classified as open-loop methods and closed-loop methods.

For open-loop power control, the terminal needs to estimate uplink pathloss. To estimate uplink pathloss, the terminal estimates downlink pathloss, and regards the estimated downlink pathloss as uplink pathloss.

A base station notifies the terminal of a "referenceSignalPower" parameter so that the terminal can estimate downlink pathloss. Here, referenceSignalPower has a value expressing CRS energy per resource element (EPRE) in dBm.

Specifically, a pathloss $PL_c$ is defined in 5.1.1.1 of 3GPP TS 36.213 that is the LTE Release-10 standard as follows.

"$PL_c$ is the downlink pathloss estimate calculated in the UE for serving cell c in dB and $PL_c$=referenceSignalPower−higher layer filtered RSRP, where referenceSignalPower is provided by higher layers and RSRP is defined in [5] for the reference serving cell and the higher layer filter configuration is defined in [11] for the reference serving cell. The serving cell chosen as the reference serving cell and used for determining referenceSignalPower and higher layer filtered RSRP is configured by the higher layer parameter pathlossReferenceLinking."

Here, referenceSignalPower denotes CRS EPRE, and higher layer filtered reference signal received power (RSRP) can be obtained from a CRS received by a terminal. In other words, the terminal calculates downlink pathloss from CRS EPRE and the received CRS.

In a first method among uplink power control methods based on a CRS according to an exemplary embodiment of the present invention, a large-area point and a small-area point both transmit the same CRS using the same resources. Here, when power control is performed based on a CRS, the following problems may occur in pathloss estimation.

For convenience, a case in which there are one large-area point and one small-area point will be described below as an example. However, a conclusion obtained through the example can also be applied to a case in which there are one or more small-area points likewise.

First, assuming that E1 is an EPRE of a CRS transmitted by a large-area point and E2 is an EPRE of a CRS transmitted by a small-area point, an EPRE of a CRS received by a terminal can be expressed by Equation 9.

$$Er\_UE = E1 \times a + E2 \times b \quad \text{[Equation 9]}$$

In Equation 9, a is a loss coefficient representing pathloss between the large-area point and the terminal, and b is a loss coefficient representing pathloss between the small-area point and the terminal.

A power ratio DL_PL of transmission power E_total to reception power Er_UE corresponding to downlink pathloss can be expressed by Equation 10.

$$DL\_PL = E\_\text{total}/Er\_UE = (E1+E2)/(E1 \times a + E2 \times b) \quad \text{[Equation 10]}$$

Meanwhile, pathloss of an actual uplink can be calculated as described below. Here, it is assumed that each of the pathloss between the large-area point and the terminal and the pathloss between the small-area point and the terminal is identical between a downlink and the uplink.

Assuming that the terminal transmits an energy of Et_UE, total reception energy Er_eNB received by a base station can be expressed by Equation 11.

$$Er\_eNB = Et\_UE \times + Et\_UE \times Et\_UE \times (a+b) \quad \text{[Equation 11]}$$

Thus, a power ratio UL_PL of transmission power to reception power corresponding to uplink pathloss can be expressed by Equation 12.

$$UL\_PL = Et\_UE/Er\_eNB = 1/(a+b) \quad \text{[Equation 12]}$$

When Equation 12 is compared with Equation 10, it is possible to know that downlink pathloss and uplink pathloss are not identical. In particular, since existing 3GPP LTE Release-8/9/10 terminals regard downlink pathloss obtained using CRS EPRE as uplink pathloss, the aforementioned discrepancy between the downlink pathloss and the uplink pathloss causes inefficiency in uplink power control of the terminal.

To solve this problem caused by the aforementioned discrepancy between the downlink pathloss and the uplink pathloss in an exemplary embodiment of the present invention, E1 and E2 are configured to be identical, and the base station signals CRS EPRE having a value of E1 (=E2) rather than E1+E2 to the terminal. When the base station performs signaling as mentioned above, the terminal estimates downlink pathloss using a CRS EPRE value signaled from the base station, and the downlink pathloss can be obtained as shown in Equation 13.

$$DL\_PL = E1/(E1 \times a + E2 \times b) = 1/(a+b) \quad \text{[Equation 13]}$$

In other words, the estimated downlink pathloss becomes the same as actual uplink pathloss. Thus, all points transmitting CRSs need to set respective CRS EPRE to the same value, and the base station signals the CRS EPRE value to the terminal.

In a second method among uplink power control methods based on a CRS according to an exemplary embodiment of the present invention, only a large-area point transmits a CRS. Since only a large-area point transmits a CRS, and a small-area point transmits no CRS, the problem of discrepancy between downlink pathloss and uplink pathloss does not occur in the second method.

[Uplink Power Control Based on CSI RS]

To describe an uplink power control method based on a CSI RS according to an exemplary embodiment of the present invention, it is assumed that a terminal is configured with a transmission mode in which the terminal measures a CSI RS, estimates CSI, and performs PDSCH demodulation using a DM RS. Such a transmission mode corresponds to transmission mode 9 of 3GPP LTE Release-10.

First, a base station notifies a terminal of a CSI RS pattern transmitted by a point that transmits a PDSCH to the terminal. Here, when the point transmitting the PDSCH to the terminal is the same as a point receiving a PUSCH transmitted by the terminal, the terminal can calculate downlink pathloss on the basis of the CSI RS pattern configured for the terminal itself.

The terminal needs to be able to know an EPRE value of the corresponding CSI RS so as to calculate downlink pathloss. The terminal estimates downlink pathloss from a received CSI RS and an EPRE value of the CSI RS, and regards the downlink pathloss as uplink pathloss, thereby performing uplink power control. In other words, the terminal uses the CSI RS EPRE value as a referenceSignalPower value in the downlink pathloss calculation equation "$PL_c$=referenceSignalPower−higher layer filtered RSRP" during a process of calculating downlink pathloss.

Meanwhile, when the point transmitting the PDSCH to the terminal is not the same as a point receiving a PUSCH transmitted by the terminal, the base station needs to perform signaling so that the terminal can become aware of a CSI RS pattern transmitted by the point receiving the PUSCH transmitted by the terminal and an EPRE value of the CSI RS and calculate downlink pathloss. In this case, the terminal estimates downlink pathloss from a received CSI RS and an EPRE value of the CSI RS and regards the estimated downlink pathloss as uplink pathloss, thereby performing uplink power control.

[Downlink Pathloss Estimation of Terminal and Signaling of Base Station for Downlink CSI Estimation]

According to current 3GPP LTE Release-8/9/10 standards, a base station notifies a terminal of the following values:

CRS EPRE
ratio of PDSCH EPRE to CRS EPRE
ratio of PDSCH EPRE to CSI RS EPRE

In particular, the base station signals terminal-specific ratios of PDSCH EPRE to CRS EPRE and terminal-specific ratios of PDSCH EPRE to CSI RS EPRE to the corresponding terminals. Thus, a terminal can become aware of CSI RS EPRE for a CSI RS pattern configured for the terminal itself, and use the CSI RS EPRE to estimate downlink pathloss.

However, it is preferable to enable a plurality of CSI RS patterns to be configured for a terminal, and CSI RS transmission power to be separately configured for respective points because flexibility becomes high in terms of power management.

Thus, in an exemplary embodiment of the present invention, a base station can signal the following values to a terminal:

CRS EPRE
CSI RS EPRE for each of one or more CSI RS patterns
a PDSCH EPRE to CRS EPRE ratio
a PDSCH EPRE to CSI RS EPRE ratio for each CSI RS pattern Here, when it is necessary to distinguish between a power setting for a CRS-based PDSCH and a power setting for a CSI-based PDSCH, the base station needs to allow the terminal to know the following values:

CRS EPRE
a ratio of EPRE of CRS-based PDSCH to CRS EPRE
a CSI RS EPRE value of each of one or more CSI RS patterns, and a ratio of EPRE of CSI RS-based PDSCH to CSI EPRE of the CSI RS pattern

[Signaling of Base Station for Estimating CSI of Downlink Having One or More TPs]

Description will be made below about signaling of a base station for estimating downlink CSI when a downlink data channel for a predetermined terminal is transmitted by one or more points.

A set of TPs that transmit a downlink signal to a predetermined terminal is indicated as TP_set={TP_0, TP_1, ..., TP_(L−1)}. Here, TP_i denotes a predetermined TP included in a set of TPs.

The respective TPs have unique CSI RS patterns, and a base station can configure one or more CSI RS patterns for a terminal. A terminal needs to know a ratio of PDSCH EPRE to each CSI RS EPRE so as to extract downlink CSI with reference to a plurality of CSI RS patterns.

Thus, the base station needs to notify the corresponding terminals of terminal-specific PDSCH EPRE to CSI RS EPRE ratios for the CSI RS patterns of the respective TPs in TP_set through RRC signaling.

The terminals calculate downlink CSI using the signaled PDSCH EPRE to CSI RS EPRE ratios.

[Uplink Power Control Method for One or More RPs]

Description will be made below about an uplink power control method for a case in which one or more RPs receive an uplink signal transmitted by a predetermined terminal.

A set of RPs that receive an uplink signal transmitted by a predetermined terminal is indicated as RP_set={RP_0, RP_1, ..., RP_(N−1)}. Here, RP_i denotes a predetermined RP included in a set of RPs.

When transmission power of the terminal is Pt, and power received by each RP_i attenuates by a_i, total reception power Pr received by RP_set can be expressed by Equation 14.

$$Pr = Pt \times a\_0 + Pt \times a\_1 + \ldots Pt \times a\_(N-1) \qquad \text{[Equation 14]}$$
$$= Pt \times (a\_0 + a\_1 + \ldots + a\_(N-1))$$

When the terminal can estimate (a_0+a_1+ . . . +a_(N−1)) in Equation 14, the terminal can estimate a reception power value corresponding to given transmission power.

In other words, when the terminal can estimate a_i (i=0, 1, . . . , N_1) of all the RPs, (a_0+a_1+ . . . +a_(N−1)) can be estimated. When the terminal is aware of transmission power of a CSI RS of an RP RP_i, it is possible to know a power attenuation ratio of a downlink by measuring reception power of the CSI RS, and to use the downlink power attenuation ratio as the uplink power attenuation ratio a_i. Uplink pathloss is expressed by Equation 15.

$$\text{Uplink Pathloss(dB)} = 10 \times \log_{10}(Pt/Pr) = \qquad \text{[Equation 15]}$$
$$-10 \times \log_{10}(a\_0 + a\_1 + \ldots + a\_(N-1))$$

In Equation 15, a_i can be calculated in the form of a_i=(higher layer filtered RSRP for a CSI RS of RP_i)/(CSI RS EPRE of RP_i).

To this end, the base station needs to allow the terminal to know information required for detecting the CSI RS, such as patterns of CSI RSs in the time-frequency domain configured for the respective RPs RP_i belonging to RP_set, and transmission power of the respective CSI RS patterns.

Specifically, the base station can allow the terminal to know or estimate CSI RS information on the respective RPs belonging to RP_set of the terminal and the corresponding CSI RS EPRE values using one of methods A to C described below.

[Method A] The base station directly notifies the terminal of an EPRE value of a CSI RS through RRC signaling.

The base station directly notifies the terminal of an EPRE value of a CSI RS corresponding to a CSI RS pattern of each RP through RRC signaling.

[Method B] The base station notifies the terminal of an EPRE value of a CRS and an EPRE ratio between a CSI RS and the CRS through terminal-specific RRC signaling.

In 3GPP LTE Release-8/9/10 standards, it has already been defined that a terminal is notified of a CRS EPRE value through RRC signaling. In an exemplary embodiment of the present invention, the base station additionally notifies the terminal of a CSI RS EPRE to CRS EPRE ratio for a CSI RS pattern of each RP, and the terminal estimates the CSI RS EPRE.

[Method C] The base station notifies the terminal of the following values of (1) and (2) through terminal-specific RRC signaling.

(1) EPRE value of CRS and EPRE ratio between PDSCH and CRS

In the 3GPP LTE Release-8/9/10 standards, the base station notifies the terminal of a CRS EPRE value through RRC signaling.

Also, in 3GPP LTE Release-8/9/10 standards, the base station notifies the terminal of two parameters $\rho_A$ and $\rho_B$ through RRC signaling. Here, $\rho_A$ and $\rho_B$ denote ratios of PDSCH EPRE among PDSCH REs to CRS EPRE. Then, the terminal can become aware of a PDSCH EPRE to CRS EPRE ratio from each OFDM symbol.

(2) PDSCH EPRE to CSI RS EPRE Ratio for Each CSI RS Pattern

In the 3GPP LTE Release-10 standard, the base station performs RRC signaling of a PDSCH EPRE to CSI RS EPRE ratio value for one CSI RS pattern to the terminal, and the terminal extracts CSI on the assumption of the PDSCH EPRE to CSI RS EPRE ratio.

When the terminal is configured with a plurality of CSI RS patterns, the base station signals a PDSCH EPRE to CSI RS EPRE ratio for each CSI RS pattern in the same method as mentioned above.

The terminal can estimate an EPRE value of each CSI RS pattern from the information of (1) and (2).

In the above-described uplink power control method for one or more RPs, TP_set={TP_0, TP_1, . . . , TP_(L−1)}. and RP_set={RP_0, RP_1, . . . , RP_(N−1)} may differ from each other.

Transmission of e-PDCCH and PUCCH

It is preferable for a point that transmits an e-PDCCH to a terminal and a point that receives a PUCCH transmitted by the terminal to be the same point. This is assumed in the description below.

Description will be made about a method for a terminal to transmit an ACK/NACK of the corresponding PDSCH when the terminal receives downlink assignment by an e-PDCCH.

ACK/NAK resources used by the terminal may be implicitly mapped by a resource location of an e-PDCCH that the terminal has successfully received. Thus, the terminal transmits an ACK/NAK using PUCCH resources and a PUCCH format determined according to predetermined rules.

Here, the terminal can calculate pathloss from EPRE of a CSI RS transmitted by a point that transmits the e-PDCCH for power control of a PUCCH.

Also, to increase spectrum use efficiency by spatially reusing frequency resources, resources used by the terminal needs to be reused on an RP by RP basis as mentioned above.

In the present invention, a terminal assigned a VCI by a base station generates a PUCCH using the assigned VCI instead of a PCI and transmits the generated PUCCH. Alternatively, while a PCI is used as is instead of a VCI, an additional initialization parameter varying according to an RP may be introduced to generate a PUCCH.

Description has been made above about a transmission/reception method for a case in which the same PCI is assigned to all points belonging to the same cell according to the second PCI assignment method as a method of assigning a PCI to respective points in a wireless communication system including a plurality of points.

Description will be made below about a transmission/reception method for a case in which different PCIs are assigned to respective points according to the first PCI assignment method.

Physical channels used for communication between a terminal and a base station can be classified as follows:

Downlink control channel and signal (referred to as "downlink control channel" below): a PCFICH, PHICH, PDCCH, PBCH, synchronization signal, CRS, and PRS in LTE/LTE-Advanced Downlink data channel: a PDSCH and PMCH in LTE/LTE-Advanced Uplink control channel and signal (referred to as "uplink control channel" below): a PUCCH, PRACH, DM RS, and SRS in LTE/LTE-Advanced Uplink data channel: a PUSCH in LTE/LTE-Advanced In existing wireless communication systems, a terminal belongs to one cell, and receives and transmits all channels and signals on the basis of the cell to which the terminal belongs.

However, for effective communication, different cells can be configured to transmit/receive a control channel and a data channel respectively.

Figure 8:
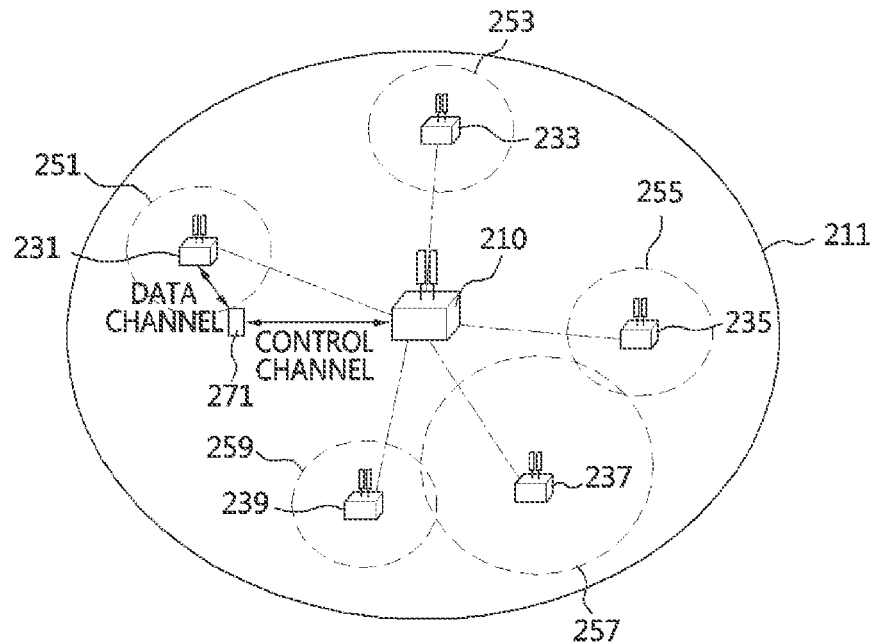
FIG. 8 is a conceptual diagram of a wireless communication system using distributed antennas according to another exemplary embodiment of the present invention.

FIG. 8 is a conceptual diagram of a wireless communication system using distributed antennas according to another exemplary embodiment of the present invention, illustrating a case in which different cells transmit/receive a control channel and a data channel respectively by way of example.

Referring to FIG. 8, in a network deployment environment in which RRH cells 251 to 259 respectively managed by a plurality of RRHs 231 to 239 in a macro-cell 211 managed by a base station 210, a first terminal 271 exchanges a control channel with the macro-cell 211 while exchanging data with the first RRH cell 251.

To implement a transmission/reception method as illustrated in FIG. 8, a base station needs to notify a terminal of a cell that exchanges a data channel with the terminal. The cell that exchanges a data channel with the terminal will be referred to as a data channel reference cell below.

The base station signals system information including a cell ID of the data channel reference cell to the terminal. The terminal regards the signaled data channel reference cell as a reference cell for transmission/reception of a data channel.

In other words, transmission/reception of a data channel is processed as if the terminal belonged to the data channel reference cell. For example, the terminal performs bit-level scrambling as if the terminal belonged to the data channel reference cell, and thereby can receive, generate or transmit a data channel.

In a transmission/reception environment as shown in FIG. 8, data channels may be classified as an uplink data channel and a downlink data channel, and different cells may be configured to receive uplink data and transmit downlink data, respectively.

Figure 9:
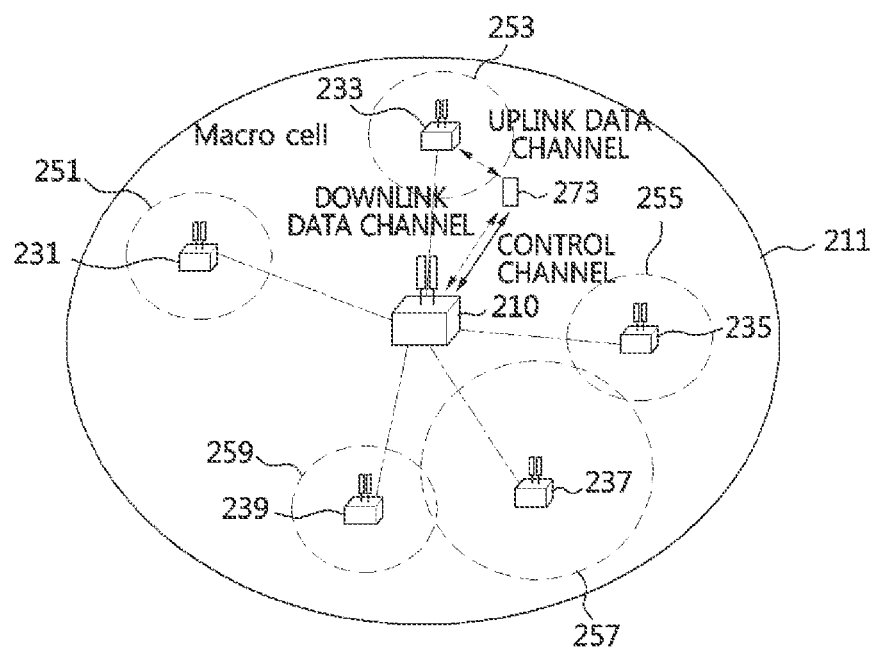
FIG. 9 is a conceptual diagram of a wireless communication system using distributed antennas according to still another exemplary embodiment of the present invention.

FIG. 9 is a conceptual diagram of a wireless communication system using distributed antennas according to still another exemplary embodiment of the present invention, illustrating a case in which different cells transmit/receive an uplink data channel and a downlink data channel respectively, by way of example.

Referring to FIG. 9, in a network deployment environment in which RRH cells 251 to 259 respectively managed by a plurality of RRHs 231 to 239 in a macro-cell 211 managed by a base station 210, a second terminal 273 exchanges a control channel with the macro-cell 211, receives downlink data from the base station 210, and transmits uplink data to the second RRH cell 253.

To implement a transmission/reception method as illustrated in FIG. 9, a base station needs to notify a terminal of a cell that transmits a downlink data channel and a cell that receives an uplink data channel. The cell that transmits a downlink data channel will be referred to as a downlink data channel reference cell, and the cell that receives an uplink data channel will be referred to as an uplink data channel reference cell.

The base station transmits system information including a cell ID of a downlink data channel reference cell to the terminal. Also, the base station transmits system information including a cell ID of an uplink data channel reference cell to the terminal.

The terminal regards the signaled downlink data channel reference cell as a reference cell for reception of a downlink data channel. In other words, reception of a downlink data channel is processed as if the terminal belonged to the downlink data channel reference cell. Likewise, the terminal regards the signaled uplink data channel reference cell as a reference cell for transmission of an uplink data channel. In other words, transmission of an uplink data channel is processed as if the terminal belonged to the uplink data channel reference cell.

Meanwhile, uplink and downlink control channels for one terminal are configured to belong to the same cell. Here, as a reference cell of a control channel, the terminal may select a cell having the highest signal intensity when the terminal is in an idle mode among cells that exchange control channels with the terminal. After an RRC connection is established, the base station can change the reference cell of a control channel due to a reason such as handover.

In an existing uplink power control method, a terminal performs uplink power control on the basis of a cell that exchanges a control channel with the terminal. Like in the existing method, in an exemplary embodiment of the present invention, a terminal belongs to one cell and receives and transmits all channels on the basis of the cell, but a base station can notify the terminal of information on a reception cell or reception cells so as to enable effective uplink power control.

The terminal can calculate downlink pathloss by measuring a CRS for each reception cell, and regards the calculated downlink pathloss of each reception cell as uplink pathloss of the reception cell. The terminal can perform power control in consideration of pathloss of a reception cell or reception cells with no assumption of reception of a control channel reference cell.

[Uplink Power Control Method for Case in which Terminal has One or More Reception Cells]

Description will be made below about an uplink power control method for a case in which one or more cells receive an uplink signal transmitted by a predetermined terminal.

A set of reception cells that receive an uplink signal transmitted by a predetermined terminal is indicated as RC_set={RC_0, RC_1, . . . , RC_(N−1)}. Here, RC_i denotes an i-th reception cell included in a set of reception cells.

When transmission power of the terminal is Pt, and power received by each RC_i attenuates by a_i, total reception power Pr received by RC_set can be expressed by Equation 16.

$$Pr = Pt \times a\_0 + Pt \times a\_1 + \ldots Pt \times a\_(N-1) \quad \text{[Equation 16]}$$
$$= Pt \times (a\_0 + a\_1 + \ldots + a\_(N-1))$$

When the terminal can estimate (a_0+a_1+ . . . +a_(N−1)) in Equation 16, the terminal can estimate a reception power value corresponding to given transmission power. In other words, when the terminal can estimate a_i of a reception cell RC_i that belongs to RC_set, (a_0+a_1+ . . . +a_(N−1)) can be estimated. When the terminal is aware of transmission power of a CRS corresponding to the reception cell RC_i, it is possible to know a power attenuation ratio of a downlink by measuring reception power of the CRS, and to use the downlink power attenuation ratio as the uplink power attenuation ratio a_i. Uplink pathloss is expressed by Equation 17.

$$\text{Uplink Pathloss(dB)} = 10 \times \log_{10}(Pt/Pr) = \quad \text{[Equation 17]}$$
$$-10 \times \log_{10}(a\_0 + a\_1 + \ldots + a\_(N-1))$$

In Equation 17, a_i can be calculated in the form of a_i=(higher layer filtered RSRP for a CRS of RC_i)/(CRS EPRE of RC_i).

To this end, the base station needs to signal information required for CRS detection, such as patterns of CRSs in the time-frequency domain configured for the respective reception cells RC_i belonging to RC_set, and transmission power of the respective CRS patterns so that the terminal can become aware of the information and the transmission power. For example, the base station can signal cell IDs of reception cells and CRS EPRE values of the respective cells to the terminal.

Alternatively, a CSI RS may be configured to serve as a CRS. In other words, when the terminal is aware of transmission power of a CSI RS corresponding to the reception cell RC_i, it is possible to know a power attenuation ratio of a downlink by measuring reception power of the CSI RS, and using the downlink power attenuation ratio as the uplink power attenuation ratio a_i, uplink pathloss is expressed by Equation 18.

$$\text{Uplink Pathloss(dB)} = 10 \times \log_{10}(Pt/Pr) = \quad \text{[Equation 18]}$$
$$-10 \times \log_{10}(a\_0 + a\_1 + \ldots L + a\_(N-1))$$

In Equation 18, a_i can be calculated in the form of a_i=(higher layer filtered RSRP for a CSI RS of RC_i)/(CSI RS EPRE of RC_i).

The base station needs to signal information required for CSI RS detection, such as patterns of CSI RSs in the time-frequency domain configured for the respective reception cells RC_i belonging to RC_set, and transmission power of the respective CSI RS patterns so that the terminal can become aware of the information and the transmission power to estimate pathloss using a CSI RS. For example, the base station can signal cell IDs of reception cells and CSI RS EPRE values of the respective cells to the terminal.

In 3GPP LTE/LTE-Advanced, a method in which a plurality of transmission and RPs (or transmission and reception cells) transmit data to a terminal or receive data from the terminal in cooperation with each other is referred to as CoMP. In particular, for terminals positioned at a cell boundary, CoMP can be useful to reduce interference from a neighboring cell or increase signal intensity.

A CoMP cooperating set denotes a set of TPs that directly or indirectly participate in downlink data transmission. CoMP TPs may consist of some or all TPs belonging to a CoMP cooperating set, and actually transmit downlink data to a terminal. A CoMP reporting set is a set of TPs through which a terminal performs CSI reporting to a base station.

Downlink CoMP transmission is classified as joint processing (JP) and coordinated scheduling/coordinated beamforming (CS/CB).

In JP CoMP transmission, a plurality of TPs geographically spaced apart share data to transmit to a terminal. In JP CoMP, joint transmission (JT) causes a plurality of TPs to simultaneously transmit the same data to a terminal using the same resources. Dynamic cell selection (DCS) causes one TP, which can dynamically vary, to transmit data at a time.

In CB/CS CoMP transmission, only a serving cell has data, and interference caused to a cell boundary terminal is reduced through cooperation with surrounding cells in scheduling and beamforming It is assumed below that one TP and one RP are in a cell. Thus, a CoMP TP can be regarded as a CoMP transmission cell. In general, cells can have different CRS configurations. In JT and DCS transmission, a terminal needs to know CRS configurations of CoMP transmission cells.

Figure 10:
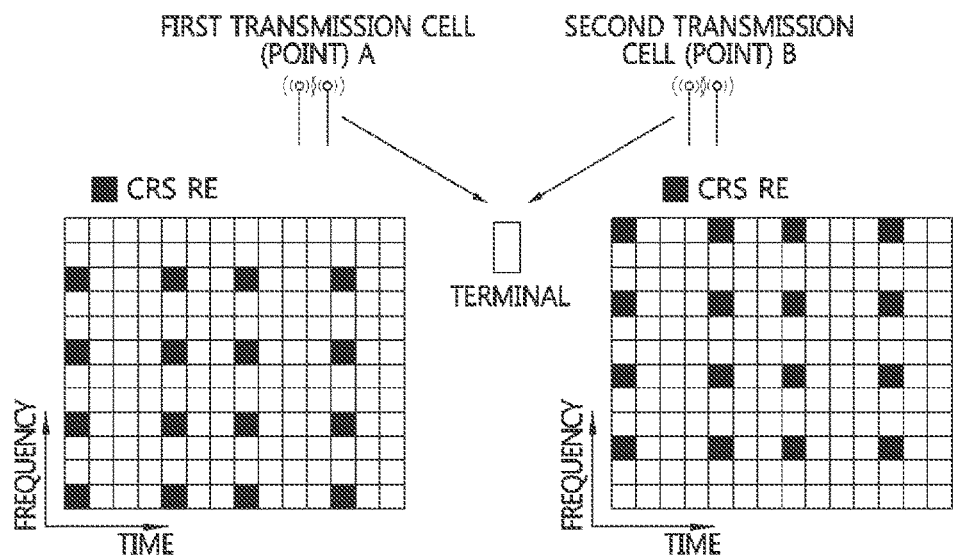
FIG. 10 is a conceptual diagram of cell-specific reference signal (CRS) resource mapping in a CoMP transmission environment according to an exemplary embodiment of the present invention.

FIG. 10 is a conceptual diagram of CRS resource mapping in a CoMP transmission environment according to an exemplary embodiment of the present invention.

In FIG. 10, a first transmission cell (or first TP) and a second transmission cell (or second TP) belong to a CoMP cooperating set of a terminal. However, as shown in FIG. 10, the first transmission cell and the second transmission cell can have REs, in which a CRS is transmitted, at different positions. Thus, the terminal needs to know CRS configuration information on each of the first transmission cell and the second transmission cell so as to demodulate a PDSCH transmitted from the transmission cells.

In JT CoMP transmission, a terminal can receive a PDSCH that is simultaneously transmitted by a plurality of cells. In a JT CoMP transmission environment, each CoMP transmission cell can transmit a PDSCH using any one of methods (1) to (3B) described below.

Method (1): each CoMP transmission cell transmits a CRS in REs in which CRSs are transmitted.

Method (2): the same data is simultaneously transmitted in REs at the same positions among REs in which all transmission cells only transmit a PDSCH. In other words, all the transmission cells simultaneously transmit the same PDSCH data in REs at the same positions among REs in which no transmission cell transmits a downlink physical channel and signals (RS and synchronization signal).

Method (3A): even when an RE of each transmission cell in which a PDSCH is transmitted collides with an RE in which a CRS of another transmission cell is transmitted, the transmission cell transmits the PDSCH in the RE.

Method (3B): when an RE of each transmission cell in which a PDSCH is transmitted collides with an RE in which a CRS of another transmission cell is transmitted, the transmission cell transmits nothing.

Among the aforementioned PDSCH transmission methods, Method (3A) or Method (3B) can be used for JT. It is preferable to configure a reference subframe for each cell to perform rate matching and mapping to REs for PDSCH transmission in JT.

According to a method of determining a reference subframe, the following transmission methods can be used:

[Method 1] A subframe (e.g., MBSFN subframe) structure with no CRS is determined as a reference subframe.

Figure 11:
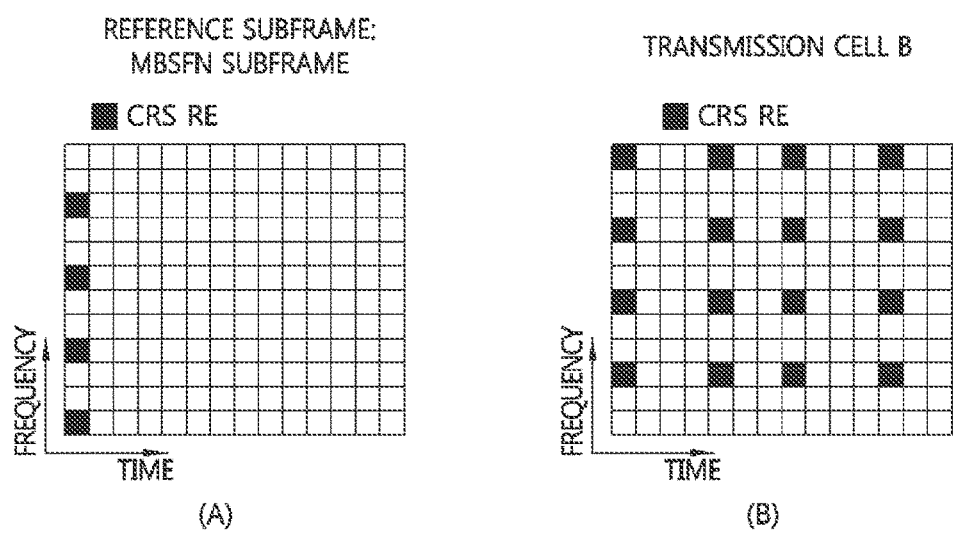
FIG. 11 is a conceptual diagram of a physical downlink shared channel (PDSCH) transmission method according to an exemplary embodiment of the present invention.

FIG. 11 is a conceptual diagram of a PDSCH transmission method according to an exemplary embodiment of the present invention, illustrating a PDSCH and CRS transmission method for a case in which a subframe structure with no CRS is determined as a reference subframe.

As shown in FIG. 11, after generating data to be transmitted in a PDSCH RE on the basis of a reference subframe ((a) of FIG. 11), each transmission cell transmits the data as is in its PDSCH RE and its CRS instead of the PDSCH data in an RE in which the CRS is transmitted ((b) of FIG. 11). In other words, the data is punctured in the CRS RE of the transmission cell. Even when the RE in which the PDSCH of the transmission cell is transmitted collides with a CRS of another transmission cell, the transmission cell transmits the PDSCH in the RE. This corresponds to PDSCH transmission method (3A) mentioned above.

[Method 2] A subframe of an anchor cell is determined as a reference subframe.

Figure 12:
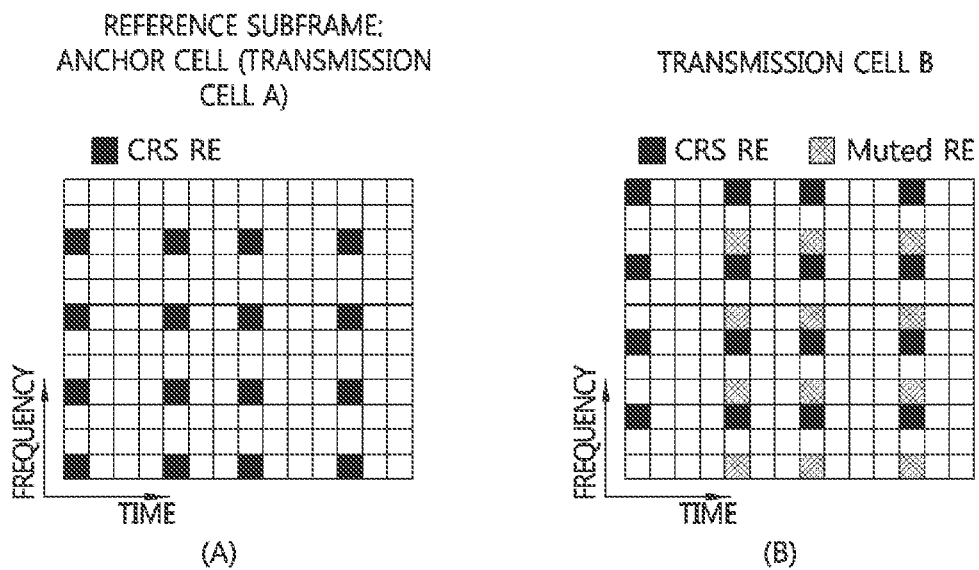
FIG. 12 is a conceptual diagram of a PDSCH transmission method according to another exemplary embodiment of the present invention.

FIG. 12 is a conceptual diagram of a PDSCH transmission method according to another exemplary embodiment of the present invention, illustrating a PDSCH and CRS transmission method for a case in which a subframe of an anchor cell is determined as a reference subframe.

As shown in FIG. 12, when an anchor cell is a transmission cell, the anchor cell employs a single-cell transmission (non-CoMP transmission) scheme as is to generate and transmit a PDSCH ((a) of FIG. 12). This case corresponds to PDSCH transmission method (3A) mentioned above. Meanwhile, a transmission cell other than an anchor cell transmits nothing in an RE (muted RE) in which a PDSCH RE of the transmission cell and a CRS RE of an anchor cell overlap ((b) of FIG. 12). This corresponds to PDSCH transmission method (3B) mentioned above. On the other hand, the transmission cell other than an anchor cell transmits the same data as sent by the anchor cell in an RE in which a PDSCH RE of the anchor cell and a PDSCH RE of the transmission cell overlap.

Here, the anchor cell may be a cell that exchanges control information with a terminal. The anchor cell may be a cell having the lowest or highest cell index among transmission cells indicated by DCI.

In JT CoMP transmission, control channel regions of transmission cells may differ from each other. In this case, in consideration of a control channel region of a cell having the largest control channel region among cells participating in transmission, it may be assumed that a PDSCH is transmitted in OFDM symbols beginning with an OFDM symbol next to the control channel region. Alternatively, a base station may directly signal a position of the OFDM symbol in which the PDSCH is started to a terminal.

In general, cells participating in CoMP transmission can have different CRS configurations, and thus a terminal needs to know the CRS configurations of the CoMP transmission cells.

In DCS CoMP transmission, a transmission cell using a given subframe can be one of cells belonging to a CoMP cooperating set. When a terminal becomes aware of CRS configuration information on a transmission cell, it is possible to know an RE in which a PDSCH is transmitted, and to use the RE for PDSCH demodulation.

As mentioned above, a terminal needs to know CRS configuration information on a transmission cell in JT and DCS CoMP transmission. The CRS configuration information may include the number of CRS ports, a cell-specific frequency shift of a CRS, and a CRS sequence.

In the CRS configuration information, the cell-specific frequency shift of a CRS and the CRS sequence are determined by a PCI. Thus, the terminal needs to know the number of CRS ports and a PCI of the transmission cell.

Also, when the terminal is aware of the CRS sequence of the transmission cell as well as the number of CRS ports and the cell-specific frequency shift of a CRS, it is possible to use an interference cancellation scheme of detecting and extracting the CRS from a received signal, and thus performance may be improved.

A method for a base station to notify a terminal of CRS configurations of CoMP transmission cells will be described below.

First, description will be made about a method for a base station to notify a terminal of CRS configuration information on CoMP transmission cells using RRC signaling and DCI.

A base station notifies a terminal of general configuration information on cells belonging to a CoMP cooperating set through terminal-specific RRC signaling. Here, the general configuration information includes CRS configuration information.

Next, the base station includes information indicating whether or not CoMP transmission cells have CRSs in DCI transmitted using a PDCCH or e-PDCCH channel.

Also, by putting a bitmap in the DCI, the base station may dynamically indicate CRS information on transmission cells that actually participate in transmission in a subframe in which the DCI is transmitted. Here, the size of the bitmap may be the number of cells belonging to a CoMP reporting set, or may be fixed to a specific size.

For example, the base station can indicate a transmission cell using a bitmap consisting of five bits in the DCI. Here, assuming that a bit "0" indicates that there is no CRS of the corresponding cell in a subframe in which the DCI is transmitted, and a bit "1" indicates that the corresponding cell participates in transmission and there is a CRS of the cell, it is possible to display a cell that participates in transmission and whether or not the cell has a CRS.

For example, when a first cell participates in CoMP transmission and has a CRS, the bitmap can be configured as "10000," and when a first cell and a third cell participate in CoMP transmission and have CRSs, the bitmap can be configured as "10100." On the other hand, when all cells participating in CoMP transmission have no CRS (e.g., all transmission cells correspond to MBSFN subframes), the bit map can be configured as "00000."

In DCS CoMP transmission, a DM RS sequence can be transmitted using the following two methods:

[Method 1] A method of generating a DM RS sequence using a PCI of a cell that transmits control information to a terminal

[Method 2] A method of generating a DM RS sequence using a PCI of a transmission cell that transmits data to a terminal Here, when Method 2 is used, the same DM RS sequence is generated on the basis of the transmission cell. Thus, when Method 2 is applied to MU MIMO in which data is transmitted to a plurality of terminals using the same resources, it is possible to assign DM RSs orthogonal to each other to the terminals.

In JT CoMP transmission, a DM RS sequence can be generated using a PCI of a cell that exchanges control information with a terminal.

In the case of an uplink, by putting a control field in DCI, a base station can indirectly notify a terminal of a transmission parameter to be used for transmission by the terminal. For example, the base station indicates a cell index in the control field in the DCI, and the terminal can transmit a PUSCH and a DM RS on the basis of the cell index using a transmission parameter (PCI, etc.) used in the corresponding cell as if the terminal belonged to the cell.

[Method 1 of Notifying Terminal of PDSCH RE Mapping in JT and DCS CoMP Transmission]

In JT and DCS CoMP transmission, control channel regions of transmission cells may differ from each other. Accordingly, it is assumed in the present invention that, in consideration of a control channel region of a cell having the largest control channel region among cells participating in transmission, a PDSCH is transmitted in OFDM symbols beginning with an OFDM symbol next to the control channel region, or a base station directly signals a position of an OFDM symbol in which the PDSCH is started to a terminal.

Description will be made below about a first method of notifying a terminal of positions of PDSCH resources allocated to the terminal in the time-frequency domain using an RRC configuration and DCI. As mentioned above, PDSCH RE mapping of a cell is determined according to a CRS port configuration and an MBSFN subframe configuration of the cell.

According to 3GPP LTE standard TS 36.211 Section 6.10.1.2, a frequency shift of a CRS port is determined by a PCI and there can be a total of six frequency shifts. A cell that uses one CRS port has six different PDSCH RE mapping patterns. On the other hand, a cell that uses two CRS ports can have a total of three different PDSCH RE mapping patterns due to six frequency shifts. Also, a cell that uses four CRS ports can have a total of three different PDSCH RE mapping patterns due to six frequency shifts.

Thus, in terms of PDSCH RE mapping, a total of 12 (=6+3+3) different mapping patterns can be generated according to CRS port configurations. Considering a PDSCH RE mapping pattern in addition to the 12 mapping patterns, there are a total of 13 different mapping patterns. Thus, a 4-bit control field is required to indicate which one of these PDSCH mapping patterns is used. However, assuming that sufficient performance gain can be obtained even when the number of cells actually participating in DCS and JT CoMP transmission is merely about three, a base station may notify a terminal of some mapping pattern candidates that may be actually used in consideration of surrounding cells of the terminal through RRC signaling, and dynamically notify the terminal of which one of the candidate mapping patterns is used through DCI, which is advantageous for reducing signaling overhead of DCI.

First, the base station configures a plurality of PDSCH RE mapping patterns for the terminal using RRC signaling. Information on the PDSCH RE mapping patterns may include MBSFN subframe information (corresponding to (a) of FIG. 11) and information on PDSCH RE mapping patterns according to the number of CRS ports and a frequency shift value.

As the frequency shift value, a variable $V_{shift}$ defined in 3GPP LTE standard TS 36.211 Section 6.10.1.2 can be used. In exemplary embodiments of the present invention, a base station can configure the following four PDSCH RE mapping patterns for a terminal through RRC signaling in consideration of CRS port configurations of surrounding cells of the terminal.

Pattern 1a: MBSFN
Pattern 2a: the number of CRS ports 2, frequency shift 0
Pattern 3a: the number of CRS ports 2, frequency shift 1
Pattern 4a: the number of CRS ports 2, frequency shift 2

Figure 13:
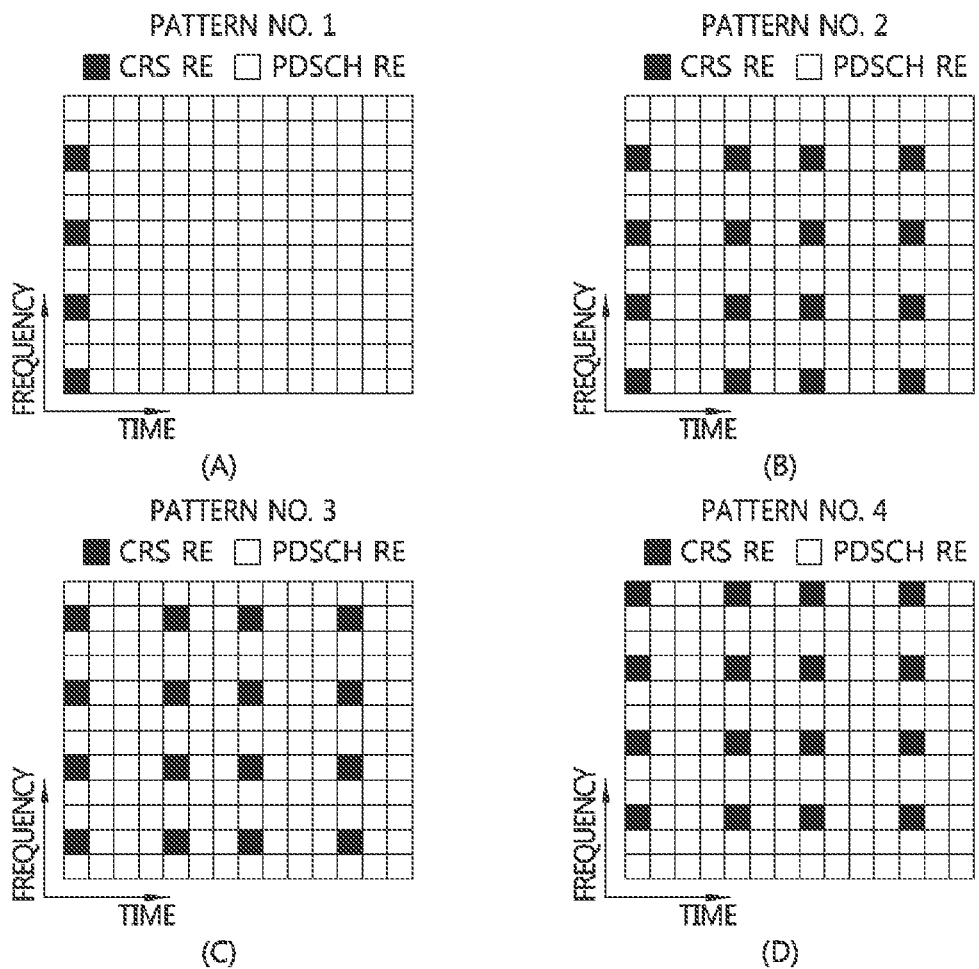
FIG. 13 is a conceptual diagram of PDSCH resource element (RE) mapping patterns according to exemplary embodiments of the present invention.

FIG. 13 is a conceptual diagram of PDSCH resource element (RE) mapping patterns according to exemplary embodiments of the present invention. (a) of FIG. 13 shows an example of Pattern 1a, (b) of FIG. 13 shows an example of Pattern 2a, (c) of FIG. 13 shows an example of Pattern 3a, and (d) of FIG. 13 shows an example of Pattern 4a.

In FIG. 13, an RE region in which a PDCCH (or a PDCCH and an e-PDCCH) is transmitted is not shown, but PDSCH REs are not mapped to REs that are present in a forepart of a subframe and used by a PDCCH and an e-PDCCH. In other words, a terminal needs to know REs used by a PDCCH and an e-PDCCH in advance, and understand that these REs are not PDSCH REs.

To this end, a base station can notify the terminal of a position of an OFDM symbol at which a PDSCH is started through additional signaling. In this case, the terminal needs to understand that PDSCH REs are mapped to REs in which no e-PDCCH and no CRS port are transmitted among REs behind the OFDM symbol at which the PDSCH is started. Also, when there are REs to which PDSCH REs are not mapped because a zero-power CSI RS is configured, these REs need to be excluded from PDSCH RE mapping.

Meanwhile, the base station may indicate a value for use by substituting pattern information for $N_{ID}^{cell}$ used for initializing CRS sequence generation and obtaining a frequency shift value. For example, the base station can notify the terminal of information on Pattern 1b to Pattern 4b below instead of information on Pattern 1a to Pattern 4a above.

Pattern 1b: MBSFN
Pattern 2b: the number of CRS ports 2, $V_{ID}^0$
Pattern 3b: the number of CRS ports 2, $V_{ID}^1$
Pattern 4b: the number of CRS ports 2, $V_{ID}^2$ In this way, when the base station notifies the terminal of the information on Pattern 1b to Pattern 4b, the terminal can obtain a frequency shift value and a CRS sequence of each CRS pattern by inserting $V_{ID}^i$ (i=0, 1 and 2) instead of $N_{ID}^{cell}$ in a frequency shift formula $v_{shift}=N_{ID}^{cell}$ mod 6 and a CRS sequence generation initialization formula $c_{init}=2^{10}\cdot(7\cdot(n_s\cdot1)+I+1)\cdot(2\cdot N_{ID}^{cell}+1)+2\cdot N_{ID}^{cell}+N_{CP}$.

When the terminal becomes aware of a sequence as well as a pattern of a CRS port, it is possible to employ a reception scheme of detecting and removing a CRS that causes interference in JT, and reception performance is improved.

Next, the base station notifies the terminal of which PDSCH RE mapping is used among Pattern 1b to Pattern 4b above using a 2-bit control field for a PDCCH or an e-PDCCH transmitted to the terminal. According to mapping patterns configured by RRC and a DCI value, the terminal becomes aware of how PDSCH resources allocated to the terminal are mapped in the time-frequency domain.

The above method can be used in both JT and DCS transmission. The base station can perform PDSCH transmission by select PDSCH RE mapping in consideration of a CRS port of a transmission cell or transmission cells, and notify the terminal of information on used PDSCH RE mapping through DCI.

The terminal obtains the PDSCH RE mapping information through RRC and DCI, receives a PDSCH, and then demodulates the PDSCH.

[Method 2 of Notifying Terminal of PDSCH RE Mapping in JT and DCS CoMP Transmission]

In JT and DCS CoMP transmission, control channel regions of transmission cells may differ from each other. It is assumed that, in consideration of a control channel region of a cell having the largest control channel region among cells participating in transmission, a PDSCH is transmitted in OFDM symbols beginning with an OFDM symbol next to the control channel region, or a base station directly signals a position of the OFDM symbol in which the PDSCH is started to a terminal.

Description will be made below about a second method of notifying a terminal of positions of PDSCH resources allocated to the terminal in the time-frequency domain using an RRC configuration and DCI. As mentioned above, PDSCH RE mapping of a cell is determined according to a CRS port configuration and an MBSFN subframe configuration of the cell. As a PDSCH RE mapping method, the following two mapping methods can be used:

[Method 1] A base station notifies a terminal of a PDSCH RE muting pattern. REs corresponding to the muting pattern are not used for PDSCH transmission. Muting patterns correspond to CRS patterns of transmission cells.

[Method 2] A base station notifies a terminal of CRS patterns of transmission cells. Each cell may use REs other than REs corresponding to its CRS pattern for PDSCH transmission, or some cells may not participate in transmission. Details of relating PDSCH RE mapping will be described later.

A base station and a terminal need to know in advance which one of the two methods is used. The base station may signal which one of the two methods is used to the terminal through RRC signaling.

[Method 1] and [Method 2] have difference in PDSCH RE mapping but can perform signaling for notifying a terminal of a muting pattern and a CRS pattern in the same way because the muting pattern is generated as a combination of CRS patterns of transmission cells.

A signaling method that can be applied to both [Method 1] and [Method 2] in common will be described below.

According to 3GPP LTE standard TS 36.211 Section 6.10.1.2, a frequency shift of a CRS port is determined by a PCI and there can be a total of six frequency shifts. Six different CRS mapping patterns are generated from a cell that uses one CRS port. On the other hand, from a cell that uses two CRS ports, a total of three different CRS mapping patterns can be generated due to six frequency shifts. Also, for a cell that uses four CRS ports, a total of three different CRS mapping patterns can be generated due to six frequency shifts.

First, a base station configures a plurality of base muting/CRS patterns for a terminal using RRC signaling. Each basic muting/CRS pattern may correspond to one CRS pattern determined according to the number of CRS ports and a frequency shift. However, a CRS pattern generated as a combination of two or more CRS patterns may be configured as a basic muting/CRS pattern.

As the frequency shift value, a variable $V_{shift}$ defined in 3GPP LTE standard TS 36.211 Section 6.10.1.2 can be used. In exemplary embodiments of the present invention, a base station can configure the following three basic muting/CRS patterns for a terminal through RRC signaling in consideration of CRS port configurations of surrounding cells of the terminal.

Basic muting/CRS pattern 1a: the number of CRS ports 2, frequency shift 0

Basic muting/CRS pattern 2a: the number of CRS ports 2, frequency shift 1

Basic muting/CRS pattern 3a: the number of CRS ports 2, frequency shift 2

FIG. 14 is a conceptual diagram of basic muting/CRS patterns according to exemplary embodiments of the present invention, showing examples of the three basic muting/CRS patterns.

(a) of FIG. 14 shows an example of Basic muting/CRS pattern 1a, (b) of FIG. 14 shows an example of Basic muting/CRS pattern 2a, and (c) of FIG. 14 shows an example of Basic muting/CRS pattern 3a.

Meanwhile, a combination of basic muting/CRS patterns is determined as a muting/CRS pattern actually used in a subframe. A base station notifies a terminal of a muting/CRS pattern used for PDSCH transmission in the corresponding subframe using a DCI control field included in a PDCCH or an e-PDCCH transmitted to the terminal. As the muting/CRS pattern used at this time, the combination of basic muting/CRS patterns is determined.

For example, the DCI control field for indicating a muting/CRS pattern can consist of three bits. As described above, each bit can correspond to one basic muting/CRS pattern configured through RRC, and a bit value can indicate whether or not the corresponding basic muting/CRS pattern is in a subframe in which DCI is transmitted. For example, a bit "0" indicates that there is no corresponding pattern, and a bit "1" indicates that there is the corresponding pattern. The base station can notify the terminal of the following information according to a value of the 3-bit control field (a b c):

(0 0 0): this value indicates that no muting/CRS pattern is in the corresponding subframe, like in an MBSFN subframe.

(1 0 0): this value indicates that Basic muting/CRS pattern 1a is a muting/CRS pattern.

(0 1 0): this value indicates that Basic muting/CRS pattern 2a is a muting/CRS pattern.

(0 0 1): this value indicates that Basic muting/CRS pattern 3a is a muting/CRS pattern.

(1 1 0): this value indicates that a pattern obtained as a union of Basic muting/CRS pattern 1a and Basic muting/CRS pattern 2a is a muting/CRS pattern.

(1 0 1): this value indicates that a pattern obtained as a union of Basic muting/CRS pattern 1a and Basic muting/CRS pattern 3a is a muting/CRS pattern.

(0 1 1): this value indicates that a pattern obtained as a union of Basic muting/CRS pattern 2a and Basic muting/CRS pattern 3a is a muting/CRS pattern.

(1 1 1): this value indicates that a pattern obtained as a union of Basic muting/CRS pattern 1a, Basic muting/CRS pattern 2a and Basic muting/CRS pattern 3a is a muting/CRS pattern.

FIG. 15 is a conceptual diagram of muting/CRS patterns depending on a control field value according to exemplary embodiments of the present invention. (a) of FIG. 15 shows an example of a muting/CRS pattern when a control field in DCI is (0 0 0), (b) of FIG. 15 shows an example of a muting/CRS pattern when the control field is (1 1 0), and (c) of FIG. 15 shows an example of a muting/CRS pattern when the control field is (1 1 1).

A PDSCH RE mapping method according to each muting/CRS pattern will be described below.

In the case of (0 0 0), all transmission cells have no CRS. In this case, REs excluding a control region, etc. are used for PDSCH transmission according to both [Method 1] and [Method 2], the two mapping methods mentioned above.

In the cases of (1 0 0), (0 1 0) and (0 0 1), only one basic muting/CRS pattern is present. In these cases, a transmission cell(s) uses REs excluding REs corresponding to the muting/CRS pattern, a control region, etc. for PDSCH transmission according to [Method 1].

In the cases of (1 1 0), (1 0 1), (0 1 1) and (1 1 1), two or more basic muting/CRS patterns are present. In these cases, a transmission cell(s) uses REs excluding REs corresponding to the muting/CRS patterns, a control region, etc. for PDSCH transmission according to [Method 1].

In the cases of (1 0 0), (0 1 0), (0 0 1), (1 1 0), (1 0 1), (0 1 1) and (1 1 1), cases excluding (0 0 0), [Method 2a] or [Method 2b] below can be considered as a PDSCH RE mapping method according to [Method 2].

[Method 2a] A subframe (e.g., MBSFN subframe) structure with no CRS is determined as a reference subframe. In this case, after generating data to be transmitted in a PDSCH RE on the basis of the reference subframe, each transmission cell transmits the data as is in its PDSCH RE and its CRS instead of the PDSCH data in an RE in which the CRS is transmitted. In other words, the data is punctured in the CRS RE of the transmission cell. This case corresponds to FIG. 11 described above. Also, even when the RE in which the PDSCH of the transmission cell is transmitted collides with a CRS of another transmission cell, the transmission cell transmits the PDSCH in the RE.

[Method 2b] One of basic muting/CRS patterns is determined as a reference subframe. A cell that transmits a CRS corresponding to the reference pattern generates and transmits a PDSCH, employs a single-cell transmission (non-CoMP transmission) scheme as is to generate and transmit a PDSCH. A transmission cell that does not transmit the reference pattern CRS transmits nothing in an RE in which a PDSCH RE of the transmission cell and a reference pattern CRS RE collide, and transmits the same data as sent by the cell that transmits the reference pattern CRS in an RE in which the reference pattern CRS and the PDSCH RE of the transmission cell do not collide. This case corresponds to FIG. 12 described above. Here, as the reference pattern, a pattern having the lowest index or the highest index among basic muting/CRS patterns indicated to be present (i.e., indicated as "1" in a bitmap) in DCI can be designated.

When a terminal employs a reception scheme of detecting and canceling a CRS pattern, [Method 2a] and [Method 2b] can improve reception performance.

On the other hand, in the PDSCH RE mapping method of [Method 1], REs that collide with CRS patterns are muted. Thus, [Method 1] may be applied to a case in which a terminal does not detect nor cancel a CRS pattern.

A base station and a terminal need to know which one of [Method 1], [Method 2a] and [Method 2b] is used. The base station may notify the terminal of a method in use through signaling.

The terminal can become aware of how PDSCH resources allocated to the terminal are mapped in the time-frequency domain from basic muting/CRS patterns configured by RRC and a DCI control field, and demodulate a PDSCH using the information.

In FIG. 15, an RE region in which a PDCCH (or a PDCCH and an e-PDCCH) is transmitted is not shown, but PDSCH REs are not mapped to REs that are present in a forepart of a subframe and used by a PDCCH and an e-PDCCH. In other words, a terminal needs to know REs used by a PDCCH and an e-PDCCH in advance, and considers that these REs are not PDSCH REs.

To this end, a base station can notify the terminal of a position of an OFDM symbol at which a PDSCH is started through additional signaling. In this case, the terminal considers that PDSCH REs are mapped to REs in which no e-PDCCH and no CRS port are transmitted among REs behind the OFDM symbol at which the PDSCH is started. Also, when there are REs to which PDSCH REs are not mapped because a zero-power CSI RS is configured, these REs need to be excluded from PDSCH RE mapping.

Meanwhile, the base station may indicate a value for use by substituting basic muting/CRS pattern information for $N_{ID}^{cell}$ used for initializing CRS sequence generation and obtaining a frequency shift value. For example, the base station can notify the terminal of information on Basic muting/CRS pattern 1b to Basic muting/CRS pattern 3b below instead of information on Basic muting/CRS pattern 1a to Basic muting/CRS pattern 3a above.

Basic muting/CRS pattern 1b: the number of CRS ports 2, $V_{ID}^{0}$

Basic muting/CRS pattern 2b: the number of CRS ports 2, $V_{ID}^{1}$

Basic muting/CRS pattern 3b: the number of CRS ports 2, $V_{ID}^{2}$

In this way, when the base station notifies the terminal of the information on Basic muting/CRS pattern 1b to pattern 3b, the terminal can obtain a frequency shift value and a CRS sequence of each CRS pattern by inserting $V_{ID}^{i}$ (i=0, 1 and 2) instead of $N_{ID}^{cell}$ in a frequency shift formula $v_{shift}=N_{ID}^{cell}$ mod 6 and a CRS sequence generation initialization formula $c_{init}=2^{10} \cdot (7 \cdot (n_s+1)+I+1) \cdot (2 \cdot N_{ID}^{cell}+1)+2 \cdot N_{ID}^{cell} N_{CP}$.

When the terminal can become aware of a sequence as well as a pattern of a CRS port, using [Method 2] among the PDSCH RE mapping methods described above, it is possible to employ a reception scheme of detecting and removing a CRS that causes interference in JT CoMP transmission, and thus reception performance can be improved.

Periodic CSI Reporting Method

Among methods for a terminal to feed back CSI for supporting CoMP in a wireless communication system using distributed antennas according to exemplary embodiments of the present invention, a periodic CSI reporting method will be described below.

A CSI reporting method defined in existing 3GPP LTE Release 8 to 10 standards are specified in 3GPP TS 36.213 Section 7.2.2, and supports four modes including modes 1-0, 1-1, 2-0 and 2-1.

A wireless communication system using distributed antennas according to exemplary embodiments of the present invention performs feedback for supporting CoMP while reusing structures of the modes defined in the existing standards as much as possible.

Periodic CSI reporting modes using a PUCCH for supporting CoMP are defined as modes 1-0, 1-1, 2-0 and 2-1.

CoMP feedback is enabled only when a plurality of CSI-RS resources are configured for a terminal. Thus, in order to perform CoMP feedback, the terminal needs to be configured with transmission mode 9, and precoding matrix indicator (PMI)/rank indicator (RI) reporting (parameter: pmi-RI-Report) needs to be configured. This is because, when no PMI/RI reporting is configured, a CQI is calculated using a CRS.

Periodic CSI reporting modes supported according to the number of CSI-RS ports of CSI-RS resources are as follows:

When all the numbers of CSI-RS ports of respective CSI-RS resources are greater than 1: mode 1-1 and 2-1

When all the numbers of CSI-RS ports of respective CSI-RS resources are 1: mode 1-0 and 2-0

In general, the number of CSI-RS ports in a CSI-RS resource can be configured differently according to respective CSI-RS resources, but CoMP feedback is limited to the cases above.

A CSI-RS measurement set consisting of non-zero-power CSI-RS resources is configured for feedback of the terminal.

When the total number of non-zero-power CSI-RS resources belonging to a CSI-RS measurement set M is $S_M$, the CSI-RS measurement set M can be expressed by Equation 19.

$$M=\{CSI\text{-}RS_0, \ldots, CSI\text{-}RS_{S_M-1}\} \quad \text{[Equation 19]}$$

In Equation 19, $CSI\text{-}RS_i$ (i=0, . . . , $S_M-1$) denotes a non-zero-power CSI-RS resource belonging to a CSI-RS measurement set.

For periodic CSI reporting using a PUCCH, a simplified method based on per-CSI-RS resources is used. Assuming that TPs associated with CSI-RS resources belonging to a CoMP measurement set separately perform transmission, the terminal configures RI/PMI/CQI feedback for the respective CSI-RS resources.

It is assumed that each of the CSI-RS resources has the one corresponding TP.

[Rank Indicator (RI)]

The terminal configures RI reporting in CSI-RS resource units. Here, the terminal selects an RI preferred for each of the CSI-RS resources belonging to the measurement set. At the same time, it is assumed that transmission occurs only at the corresponding TP.

[Precoding Matrix Indicator (PMI)]

The terminal configures wideband PMI reporting in CSI-RS resource units. Here, the terminal selects a precoding matrix preferred for each of the CSI-RS resources belonging to the measurement set. At this time, it is assumed that transmission occurs only at the corresponding TPs. Here, a wideband PMI denotes PMI reporting that reflects a channel state of an entire cell bandwidth.

[Channel Quality Indicator (CQI)]

The terminal configures wideband CQI reporting in CSI-RS resource units. At this time, the terminal estimates a per-CSI-RS resource CQI by applying a preferred PMI to a CSI-RS resource. In estimation of each CQI, interference is calculated as the sum of signals generated by all TPs that do not belong to the CoMP measurement set. Here, a wideband CQI denotes CQI reporting that reflects a channel state of an entire cell bandwidth.

[Determination of Reporting Period and Reporting Subframe According to Feedback Content]

Feedback reporting of a terminal is performed in the same way as specified in 3GPP LTE Release-10 except that it is alternately performed on CSI-RS resources belonging to the CSI-RS measurement set and has a different assumption about interference. It is assumed that parameters which are not specifically mentioned below follow definition in 3GPP LTE Release-10 TS 36.213 Section 7.2.2.

When a CSI-RS measurement set is configured for the terminal, the terminal performs CSI reporting of all CSI-RS resources in the configured measurement set. Here, a CSI-RS measurement set is configured for each terminal through terminal-specific RRC signaling. In the description below, CSI-RS resources belonging to a CSI-RS measurement set are indicated as $CSI\text{-}RS_i$ (i=0, . . . , $S_M-1$), and a TP corresponding to a $CSI\text{-}RS_i$ is indicated as $TP_i$. Also, it is assumed below that, when no CSI-RS channel measurement is configured for the terminal, terminal feedback reporting is defined for one cell, and a TP corresponding to the cell is indicated as $TP_0$.

(1) Case of Wideband CQI/PMI Reporting being Configured (1.1) Wideband CQI/PMI reporting of $TP_i$ is performed in subframes satisfying Equation 20 and Equation 21.

$$(10 \times n_f + \lfloor n_s/2 \rfloor - N_{OFFSET,CQI}) \mod(N_{pd}) = 0 \quad \text{[Equation 20]}$$

$$\left(\left\lfloor \frac{10 \times n_f + \lfloor n_s/2 \rfloor - N_{OFFSET,CQI}}{N_{pd} \cdot M_{RI}} \right\rfloor\right) \mod(S_M) = i \quad \text{[Equation 21]}$$

(1.2) When RI reporting is configured, a reporting interval of RIs is set by multiplying a period $N_{pd}$ by an integer $M_{RI}$. RI reporting for $TP_i$ is performed in a subframe satisfying Equation 22.

$$(10 \times n_f + \lfloor n_s/2 \rfloor - N_{OFFSET,CQI} - N_{OFFSET,RI} - I \cdot N_{pd} \cdot M_{pd})$$
$$\mod(S_M \cdot N_{pd} \cdot M_{pd}) = 0 \quad \text{[Equation 22]}$$

Figure 16:
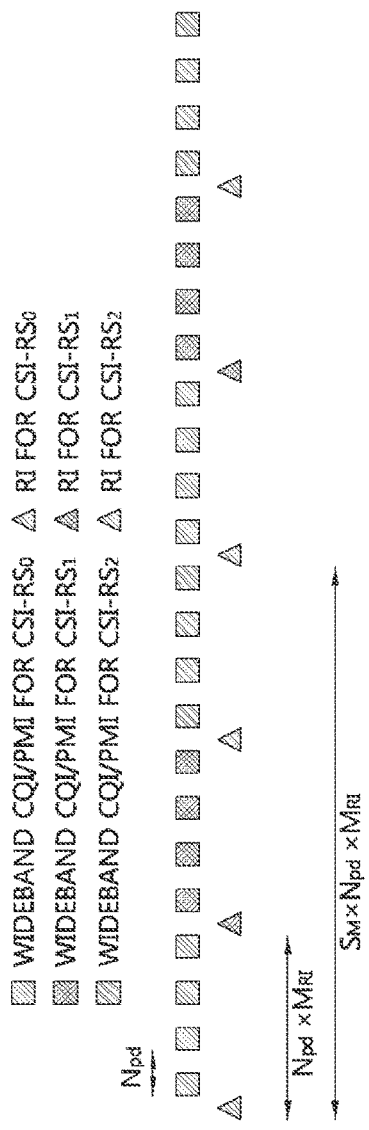
FIG. 16 is a conceptual diagram of subframes in which PUCCH feedback is performed, and content of the feedback when wideband channel quality indicator (CQI)/precoding matrix indicator (PMI) reporting is configured according to an exemplary embodiment of the present invention.

FIG. 16 is a conceptual diagram of subframes in which PUCCH feedback is performed and content of the feedback when wideband CQI/PMI reporting is configured.

Referring to FIG. 16, a terminal alternately performs wideband CQI/PMI reporting of $CSI\text{-}RS_0$ corresponding to a TP $TP_0$, $CSI\text{-}RS_1$ corresponding to a TP $TP_1$ and $CSI\text{-}RS_2$ corresponding to a TP $TP_2$ at intervals of $N_{pd} \times M_{RI}$, and performs wideband CQI/PMI reporting of each of $CSI\text{-}RS_0$, $CSI\text{-}RS_1$ and $CSI\text{-}RS_2$ at intervals of $N_{pd}$ in a reporting section of a TP corresponding to a period.

Also, the terminal alternately performs RI reporting for the respective TPs $TP_0$, $TP_1$ and $TP_2$ at intervals of $N_{pd} \times M_{RI}$. Thus, reporting of all CSI-RS resources are repeated at intervals of $S_M \times N_{pd} \times M_{RI}$, which is a product of the total number $S_M$ of non-zero-power CSI-RS resources belonging to the CSI-RS measurement set and $N_{pd} \times M_{RI}$.

Figure 17:
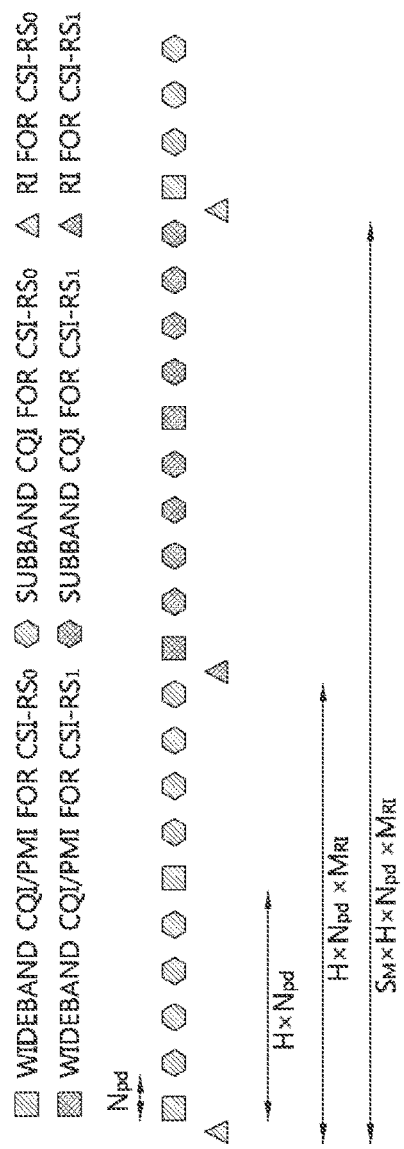
FIG. 17 is a conceptual diagram of subframes in which PUCCH feedback is performed, and content of the feedback when wideband CQI/PMI and subband CQI/PMI reporting is configured according to an exemplary embodiment of the present invention.

(2) Case of Wideband CQI/PMI Reporting and Subband CQI Reporting Both being Configured FIG. 17 is a conceptual diagram of subframes in which PUCCH feedback is performed and content of the feedback when wideband CQI/PMI reporting and subband CQI/PMI reporting are configured.

A reporting method for a case in which both wideband CQI/PMI reporting and subband CQI reporting are configured will be described below with reference to FIG. 17.

(2.1) Wideband CQI/PMI and subband CQI reporting of $TP_i$ is performed in subframes satisfying Equation 23 and Equation 24. Here, subband CQI reporting denotes CQI reporting that reflects channel states of respective subbands.

$$(10 \times n_f + \lfloor n_s/2 \rfloor - N_{OFFSET,CQI}) \mod N_{pd} = 0 \quad \text{[Equation 23]}$$

$$\left(\left\lfloor \frac{10 \times n_f + \lfloor n_s/2 \rfloor - N_{OFFSET,CQI}}{H \cdot N_{pd} \cdot M_{RI}} \right\rfloor\right) \mod(S_M) = i \quad \text{[Equation 24]}$$

(2.1.1) When a precoding type indicator (PTI) is not (configured nor) transmitted, or a PTI that has been most lately transmitted is 1:

wideband CQI/wideband PMI (or a wideband CQI/wideband second PMI of transmission mode 9) reporting has a period of $H \cdot N_{pd}$, and reporting of $TP_i$ is performed in subframes satisfying Equation 25 and Equation 26.

$$(10 \times n_f + \lfloor n_s/2 \rfloor - N_{OFFSET,CQI}) \mod(H \cdot N_{pd}) = 0 \quad \text{[Equation 25]}$$

$$\left(\left\lfloor \frac{10 \times n_f + \lfloor n_s/2 \rfloor - N_{OFFSET,CQI}}{H \cdot N_{pd} \cdot M_{RI}} \right\rfloor\right) \mod(S_M) = i \quad \text{[Equation 26]}$$

In Equation 25 and Equation 26, an integer H is given as $H = J \cdot K + 1$, and J is the number of bandwidth parts.

As shown in FIG. 17, J·K report opportunities between two times of successive wideband CQI/wideband PMI (or a wideband CQI/wideband second PMI of transmission mode 9) reporting are sequentially used for subband CQI reporting of bandwidth parts, which fully cycles all the parts a total of K times. However, when a smaller number of report opportunities than J·K are between two times of successive wideband CQI/PMI reporting (e.g., because a system frame number changes to 0), the terminal omits (i.e., does not transmit) times of subband CQI reporting that have not been transmitted before a time point of second reporting between the two times of wideband CQI/wideband PMI (or a wideband CQI/wideband second PMI of transmission mode 9) reporting.

It can be seen from FIG. 17 that times of subband CQI reporting made between the aforementioned two successive times of wideband CQI/wideband PMI (or a wideband CQI/wideband second PMI of transmission mode 9) reporting have the same target TP as first reporting between the two times of wideband CQI/wideband PMI (or a wideband CQI/wideband second PMI of transmission mode 9) reporting.

Cycling of the bandwidth parts is performed in order of increasing number of bandwidth parts, beginning with bandwidth part number 0 and ending with bandwidth part number J−1. The parameter K is set by an upper layer.

(2.1.2): When a PTI that has been most lately transmitted is 0:

wideband first PMI reporting has a period of $H' \cdot N_{pd}$, and reporting of $TP_i$ is performed in subframes satisfying Equation 27 and Equation 28.

$$(10 \times n_f + \lfloor n_s/2 \rfloor - N_{OFFSET,CQI}) \mod(H' \cdot N_{pd}) = 0 \quad \text{[Equation 27]}$$

$$\left(\left\lfloor \frac{10 \times n_f + \lfloor n_s/2 \rfloor - N_{OFFSET,CQI}}{H' \cdot N_{pd} \cdot M_{RI}} \right\rfloor\right) \mod(S_M) = i \quad \text{[Equation 28]}$$

In Equation 27 and Equation 28, H' is signaled by an upper layer.

Report opportunities between two times of successive wideband first PMI reporting are used for wideband second PMI reporting having a wideband CQI.

Times of reporting made between the two times of successive wideband first PMI reporting have the same target TP as first reporting between the two times of successive wideband first PMI reporting.

(2.2) When RI reporting is configured, a period of RI reporting is set to a production of a wideband CQI/PMI reporting period $H \cdot N_{pd}$ and an integer $M_{RI}$, and an RI is reported using the same PUCCH CS resources as used when wideband CQI/PMI reporting and subband CQI reporting are performed together.

(2.2.1) RI reporting of $TP_i$ is performed in subframes satisfying Equation 29.

$$(10 \times n_f + \lfloor n_s/2 \rfloor - N_{OFFSET,CQI} - N_{OFFSET,RI} - i \cdot H \cdot N_{pd} \cdot M_{RI}) \mod(S_M \cdot H \cdot N_{pd} \cdot M_{RI}) = 0 \quad \text{[Equation 29]}$$

[Interference Assumption in PUCCH Feedback Mode]

Interference is calculated as the sum of signals received from all TPs that do not belong to a CoMP measurement set. In other words, assuming that all TPs belonging to the CoMP measurement set do not cause interference, interference is estimated.

[Periodic CSI Format Using PUCCH]

A CSI format of periodic CSI reporting using a PUCCH is the same as defined in 3GPP LTE Release-10.

[CoMP Transmission Method-Specific CQI Estimation from Per-CSI-RS Resource Feedback and Link Adaptation]

Although it is not possible to accurately obtain a CQI of a CoMP method to be actually employed from a per-CSI-RS resource CQI, an approximate CQI can be estimated as described later. Also, to complement inaccurate link adaptation caused by an inaccurate CQI, outer loop adaptation based on ACK/NAK feedback of a terminal is taken into consideration together.

Interference Measurement

Interference measurement is required for a terminal to extract CSI. The terminal measures interference using zero-power CSI-RS resources. A method for the terminal to measure interference may vary according to a zero-power CSI-RS resource configuration and a feedback mode.

Zero-power CSI-RS resources denote resources that are not used for transmission by the corresponding TP or TPs. Thus, when the terminal measures reception power of REs corresponding to CSI-RS resources, the sum of powers of signals received from TPs other than a TP or TPs corresponding to the CSI-RS resources is measured.

A base station can configure different or the same zero-power CSI-RS resources for TPs belonging to a CoMP measurement set.

(1) When the base station configures the same zero-power CSI-RS resources for the TPs belonging to the CoMP measurement set:

the terminal can calculate interference resulting from the corresponding CoMP transmission method as follows.

[Interference Estimation for CS and DPS]

In coordinated scheduling (CS) and dynamic point selection (DPS) CoMP transmission methods, only one of the TPs in the CoMP measurement set transmits a signal, and a CQI is calculated by regarding all other TPs as interference. When reception power estimated using zero-power CSI-RS resources corresponding to respective TPs is indicated as $I_{CM}$, reception power of a TP i estimated using non-zero power CSI-RS resources is indicated as $P_i$, and only a TP k transmits data, interference can be calculated using Equation 30.

$$I = I_{CM} + \sum_{i=0, i \neq k}^{K-1} P_i \quad \text{[Equation 30]}$$

Alternatively, when the sum of signals received from all the TPs is indicated as $P_{total}$, interference may be calculated using Equation 31.

$$I = P_{total} - P_k \quad \text{[Equation 31]}$$

[Interference Estimation for Coherent JT and Non-Coherent JT]

In coherent JT and non-coherent JT CoMP transmission methods, interference can be calculated as a sum $I_{CM}$ of signals received from all TPs that do not belong to the CoMP measurement set as shown in Equation 32.

$$I = I_{CM} \quad \text{[Equation 32]}$$

(2) When the base station configures non-overlapping zero-power CSI-RS resources for the TPs belonging to the CoMP measurement set:

the terminal can calculate interference corresponding to a CoMP transmission method as follows.

[Interference Estimation for CS and DPS]

Only one of the TPs in the CoMP measurement set transmits a signal, and a CQI is calculated by regarding all other TPs as interference. When reception power estimated from zero-power CSI-RS resources corresponding to a TP k participating in transmission is indicated as $I_k$, interference can be calculated using Equation 30.

$$I = I_k \quad \text{[Equation 33]}$$

[Interference Estimation for Coherent JT, Non-Coherent JT and CB]

In coherent JT, non-coherent JT and coordinated beamforming (CB) CoMP transmission methods, a CQI is estimated on the assumption that all the TPs in the CoMP measurement set use the same resources at the same time. Interference is calculated as the sum of signals received from all the TPs that do not belong to the CoMP measurement set.

When reception power estimated using zero-power CSI-RS resources corresponding to the TP k is indicated as $I_k$, and reception power of a signal for only a TP estimated using non-zero power CSI-RS resources corresponding to the TP k is indicated as $P_k$, interference can be calculated as shown in Equation 34.

$$I = I_k - \sum_{i=0, i \neq k}^{K-1} P_i \text{ or}$$

$$I = \frac{1}{K}\left(\sum_{k=0}^{K-1} I_k - \sum_{k=0}^{K-1} Q_k\right), \text{ where} \quad \text{[Equation 34]}$$

$$Q_k = \sum_{i=0, i \neq k}^{K-1} P_i$$

Alternatively, when the sum of signals received from all the TPs is indicated as $P_{total}$, interference may be calculated using Equation 35.

$$I = \sum_{k=0}^{K-1} I_k - (K-1)P_{total} \quad \text{[Equation 35]}$$

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A wireless communication method using distributed antennas, comprising:

obtaining, using an antenna at a terminal, a Physical Cell Identity (PCI) from an antenna at a transmission point;

obtaining, using an antenna at the terminal, a virtual cell identity (VCI) from an antenna at the transmission point;

receiving, using an antenna at the terminal, a Physical Downlink Control Channel (PDCCH) from the transmission point;

receiving, using an antenna at the terminal, an Enhanced Physical Downlink Control Channel (e-PDCCH) from the transmission point;

generating, using a processor in the terminal, a cell specific reference signal (CRS) based on the obtained PCI;

generating, using the processor in the terminal, a demodulation reference signal (DM RS) based on the obtained VCI; and demodulating, using the processor in the terminal, first control information from the received PDCCH, and second control information from the received e-PDCCH, wherein the PCI is commonly assigned to a plurality of transmission points belonging to a same cell to which the transmission point belongs, and the VCI is specifically assigned to the transmission point, wherein the first control information is demodulated from the received PDCCH based on the CRS, and the second control information is demodulated from the received e-PDCCH based on the DM RS, and wherein the PDCCH is bit-scrambled by using the PCI, and the e-PDCCH is bit-scrambled by using the VCI.

2. The method of claim 1, wherein the VCI is used for generating the DM RS instead of the PCI of the transmission point.

3. The method of claim 1, wherein the DM RS is initialized by using an initialized sequence determined based on a following equation:

$$c_{init}=(\lfloor n_s/2 \rfloor+1)\cdot(2N_{ID}^{cell}+1)\cdot2^{16}+n_{SCID},$$

wherein $C_{init}$ is the initialized pseudo-random sequence of the DM RS, $n_s$ is a slot index having a value of 0 or 1, $N_{ID}^{cell}$ is the VCI, and $n_{SCID}$ is a predetermined value or a value indicated by the transmission point.

4. The method of claim 3, wherein the VCI is signaled from the transmission point to the terminal via a higher layer signaling.

5. The method of claim 4, wherein the higher layer signaling is a Radio Resource Control (RRC) signaling.

6. A method of receiving control information from a transmission point, the method comprising:

obtaining, in a terminal, a Physical Cell Identity (PCI) from the transmission point;

obtaining, in the terminal, a virtual cell identity (VCI) from the transmission point;

receiving, in the terminal, a Physical Downlink Control channel (PDCCH) from the transmission point;

receiving, in the terminal, an Enhanced Physical Downlink Control Channel (e-PDCCH) from the transmission point;

generating, using a processor in the terminal, a cell specific reference signal (CRS) based on the obtained PCI;

generating, using a processor in the terminal, a demodulation reference signal (DM RS) based on the obtained VCI;

performing, using the processor in the terminal, demodulation on the PDCCH based on the generated CRS, and demodulation on the e-PDCCH based on the generated DM RS, wherein the PCI is commonly assigned to a plurality of transmission points belonging to a same cell to which the transmission point belongs, and the VCI is specifically assigned to the transmission point, and the PDCCH is bit-scrambled by using the PCI, and the e-PDCCH is bit-scrambled by using the VCI.

7. The method of claim 6, wherein the VCI is used for generating the DM RS instead of the PCI of the transmission point.

8. The method of claim 6, wherein the DM RS is initialized by using an initialized sequence determined based on a following equation:

$$c_{init}=(\lfloor n_s/2 \rfloor+1)\cdot(2N_{ID}^{cell}+1)\cdot2^{16}+n_{SCID},$$

wherein $C_{init}$ is the initialized pseudo-random sequence of the DM RS, $n_s$ is a slot index having a value of 0 or 1, $N_{ID}^{cell}$ is the VCI, and $n_{SCID}$ is a predetermined value or a value indicated by the transmission point.

9. The method of claim 8, wherein the VCI is signaled from the transmission point to the terminal via a higher layer signaling.

10. The method of claim 9, wherein the higher layer signaling is a Radio Resource Control (RRC) signaling.

11. A method of transmitting control information to a terminal, the method comprising:

signaling a physical cell identity (PCI) from a transmission point to the terminal, signaling a virtual cell identity (VCI) from the transmission point to the terminal;

generating, using a processor in the transmission point, a cell specific reference signal (CRS) based on the PCI;

generating, using the processor in the transmission point, a demodulation reference signal (DM RS) based on the VCI;

transmitting first control information from the transmission point to the terminal with the CRS, wherein the first control information is received in the terminal through a physical downlink control channel (PDCCH); and transmitting second control information from the transmission point to the terminal with the DM RS, wherein the second control information is received in the terminal through an enhanced physical downlink control channel (e-PDCCH), wherein the first control information is demodulated, by a processor in the terminal, from the PDCCH based on the CRS, and the second control information is demodulated, by the processor in the terminal, from the e-PDCCH based on the DM RS, wherein the PCI is commonly assigned to a plurality of transmission points belonging to a same cell to which the transmission point belongs, and the VCI is specifically assigned to the transmission point, and wherein the PDCCH is bit-scrambled by using the PCI, and the e-PDCCH is bit-scrambled by using the VCI.

12. The method of claim 11, wherein the VCI is used for generating the DM RS instead of the PCI of the transmission point.

13. The method of claim 11, wherein the DM RS is initialized by using an initialized sequence determined based on a following equation:

$$c_{init}=(\lfloor n_s/2 \rfloor+1)\cdot(2N_{ID}^{cell}+1)\cdot2^{16}+n_{SCID},$$

wherein $C_{init}$ is the initialized pseudo-random sequence of the DM RS, $n_s$ is a slot index having a value of 0 or 1, $N_{ID}^{cell}$ is the VCI, and $n_{SCID}$ is a predetermined value or a value indicated by the transmission point.

14. The method of claim 13, wherein the VCI is signaled from the transmission point to the terminal via a higher layer signaling.

15. The method of claim 14, wherein the higher layer signaling is a Radio Resource Control (RRC) signaling.

* * * * *